United States Patent
Marui

(10) Patent No.: US 7,656,275 B2
(45) Date of Patent: Feb. 2, 2010

(54) SYSTEM AND METHOD FOR CONTROLLING AN ALARM FOR AN ELECTRONIC DEVICE

(75) Inventor: Keizo Marui, Waterloo (CA)

(73) Assignee: Research In Motion Limited, Waterloo (CA)

( * ) Notice: Subject to any disclaimer, the term of this patent is extended or adjusted under 35 U.S.C. 154(b) by 447 days.

(21) Appl. No.: 11/615,029

(22) Filed: Dec. 22, 2006

(65) Prior Publication Data

US 2008/0150959 A1    Jun. 26, 2008

(51) Int. Cl.
    *G08B 1/00*    (2006.01)
(52) U.S. Cl. .................. 340/309.16; 455/567; 455/566; 368/244; 368/10; 345/594; 340/691.1
(58) Field of Classification Search ................. 345/594; 340/691.3, 691.1, 309.16; 455/566, 567; 368/244, 10
    See application file for complete search history.

(56) References Cited

U.S. PATENT DOCUMENTS

| 4,301,524 | A | 11/1981 | Koepp et al. | |
| 4,487,512 | A | 12/1984 | Price | |
| 5,063,544 | A | 11/1991 | Thinesen | |
| 5,812,648 | A | 9/1998 | Wanner | |
| 6,477,117 | B1 | 11/2002 | Narayanaswami et al. | |
| 6,831,568 | B1 * | 12/2004 | Cortopassi et al. | 340/815.4 |
| 7,444,383 | B2 * | 10/2008 | Horvitz | 709/207 |
| 2003/0025592 | A1 | 2/2003 | Choi et al. | |
| 2004/0097218 | A1 | 5/2004 | Vossler | |
| 2004/0203651 | A1 * | 10/2004 | Qu et al. | 455/414.1 |
| 2005/0099893 | A1 | 5/2005 | Jyrinki | |
| 2005/0233777 | A1 | 10/2005 | Twerdahl | |

OTHER PUBLICATIONS

Amorotti, M, European Search Report, Application No. Ep 06 12 7053, Apr. 10, 2007, The Hague.
Microsoft Corporation, "Getting the Most of Your Today Screen", Windows Mobile Tips and Tricks, 2007, <http://www.microsoft.com/windowsmobile/articles/todayscreen.mspx>.
S60.com, "Technology Update", Product Info, Mar. 20, 2006, <http://www.s60.com/business/productinfo/technologyupdate/?action=archiveNews&yid=2006&mid=3&whatshot=1&techup=1>.
Software Trenches, "Main Screen", TreoAlarrn, Sep. 11, 2006, <http://treoalarm.com/tour/main-screen>.
UIQ Technology, "6.1 Agenda", UIQ 3.1 Product Description, Feb. 21, 2007, 31, Revision 1.0, <http://www.uiq.com/files/UIQ_3_1_Product_description.pdf>.

* cited by examiner

*Primary Examiner*—Benjamin C Lee
*Assistant Examiner*—Ojiako Nwugo
(74) *Attorney, Agent, or Firm*—Brett J. Slaney; Blake, Cassels & Graydon LLP

(57) ABSTRACT

A graphical indicator, menu and method for modifying and displaying more than two states for the indicator is provided. An alarm indicator algorithm modifies and displays the indicator according to user-selectable options that enables a user to determine at first glance the nature of the next alarm and in particular when an alarm is not set to go off on a particular day to avoid accessing the alarm menu every time this knowledge is desired or whenever the user is uncertain of the settings. Various visual cues such as colour, graphical and textual elements can be used and the algorithm can associate these cues with appropriate alarm states. When the number of settings for the multi-state alarm is relatively large, a desktop web-based application program interface (API) may be used to facilitate setting and updating the alarm functions.

21 Claims, 21 Drawing Sheets

SYSTEM AND METHOD FOR CONTROLLING AN ALARM FOR AN ELECTRONIC DEVICE

TECHNICAL FIELD

The following relates to systems and methods for controlling an alarm for an electronic device.

DESCRIPTION OF THE PRIOR ART

Mobile device usage has become widespread amongst both individuals and corporations, and often such users rely heavily, and may even become dependent on, the use of such devices. Mobile devices are often used to conduct business, maintain contact with peers and perform other communication tasks while the user of the device is away from their home or office. As well, mobile devices are increasing used as personal organizers to remind its user of upcoming appointments and events, or as an alarm to alert or awaken the user at a predetermined time.

Mobile devices are particularly useful during business travels and other similar environments as a travel alarm when other traditional alarm clocks are unavailable or unreliable. The utility and portability of mobile devices as alarm clocks has even prompted some users to use the mobile devices as their primary alarm clock.

Typically, an alarm status indicator is provided on a display of a mobile device and comprises a binary visual indicator that is displayed only when an alarm is enabled. Although a binary alarm indicator is conveniently viewable at first glance, it is generally ineffective for indicating the alarm status of devices which implement more complex alarm schemes, where, for example, the alarm is "on" but does not activate each day. In such cases, the user cannot determine whether or not the alarm will actually go off on a particular day without checking the internal settings for the alarm, since the alarm indicator will always be displayed so as long as the alarm is set to be "on" or set to "go off" at some point in time.

It is therefore an object of the following to obviate or mitigate at least one of the above disadvantages.

BRIEF DESCRIPTION OF THE DRAWINGS

Embodiments will now be described by way of example only with reference to the appended drawings wherein:

FIG. 7(*a*) is a schematic diagram of a display for a mobile device having a binary alarm indicator when the alarm is on.

FIG. 7(*b*) is a schematic diagram of a display for a mobile device having a binary alarm indicator when the alarm is off.

FIG. 8(*b*) is the alarm menu of FIG. 8(*a*) showing additional selection options.

DETAILED DESCRIPTION OF THE DRAWINGS

Figure 1:
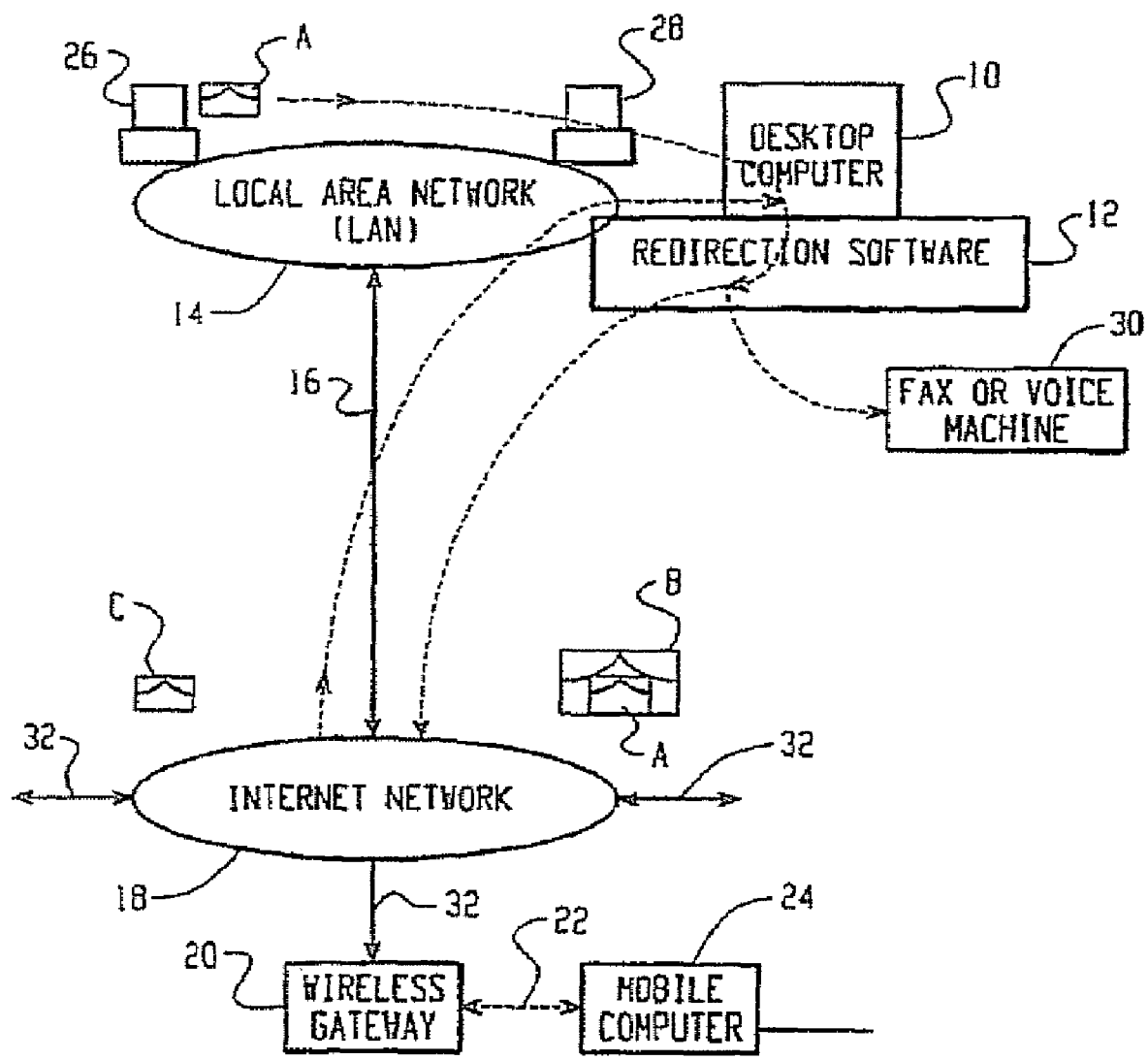
FIG. 1 is a system diagram showing the redirection of user data items from a user's desktop PC (host system) to the user's mobile device, where the redirector software is operating at the user's desktop PC.

Referring now to the drawings, FIG. 1 is an exemplary system diagram showing the redirection of user data items (such as message A or C) from a user's office PC (host system) 10 to the user's mobile device 24, where the redirector software 12 is operating at the user's PC. Message A in FIG. 1 represents an internal message sent from desktop 26 to the user's host system 10 via LAN 14. Message C in FIG. 1 represents an external message from a sender that is not directly connected to LAN 14, such as the user's mobile device 24, some other user's mobile device (not shown), or any user connected to the Internet 18. Message C also represents a command message from the user's mobile device 24 to the host system 10. As described in more detail in FIG. 3, the host system 10 preferably includes, along with the typical hardware and software associated with a workstation or desktop computer, the redirector program 12, a TCP/IP subsystem 42, a primary message store 40, an E-mail subsystem 44, a screen saver subsystem 48, and a keyboard subsystem 46.

In FIG. 1, the host system 10 is the user's desktop system, typically located in the user's office. The host system 10 is connected to a LAN 14, which also connects to other computers 26, 28 that may be in the users office or elsewhere. The LAN 14, in turn, is connected to a wide area network ("WAN") 18, preferably the Internet, which is defined by the use of the Transmission Control Protocol/Internet Protocol ("TCP/IP") to exchange information, but which, alternatively could be any other type of WAN. The connection of the LAN 14 to the WAN 18 is via high bandwidth link 16, typically a T1 or T3 connection. The WAN 18 in turn is connected to a variety of gateways 20, via connections 32. A gateway forms a connection or bridge between the WAN 18 and some other type of network, such as an RE wireless network, cellular network, satellite network, or other synchronous or asychronous land-line connection.

In one embodiment, mobile device 24 is a hand-held two-way wireless paging computer, a wirelessly enabled palm-top computer, a mobile telephone with data messaging capabilities, or a wirelessly enabled laptop computer, but could, alternatively be other types of mobile devices capable of sending and receiving messages via a network connection 22. Mobile devices 24 could alternatively not be capable of sending and receiving message via network connection 22. In another embodiment, mobile device 24 is a digital entertainment device, such as an MP3 player or video game device. In yet another embodiment, mobile device 24 is any electronic device which can be used by a user to provide an alarm.

Figure 4:
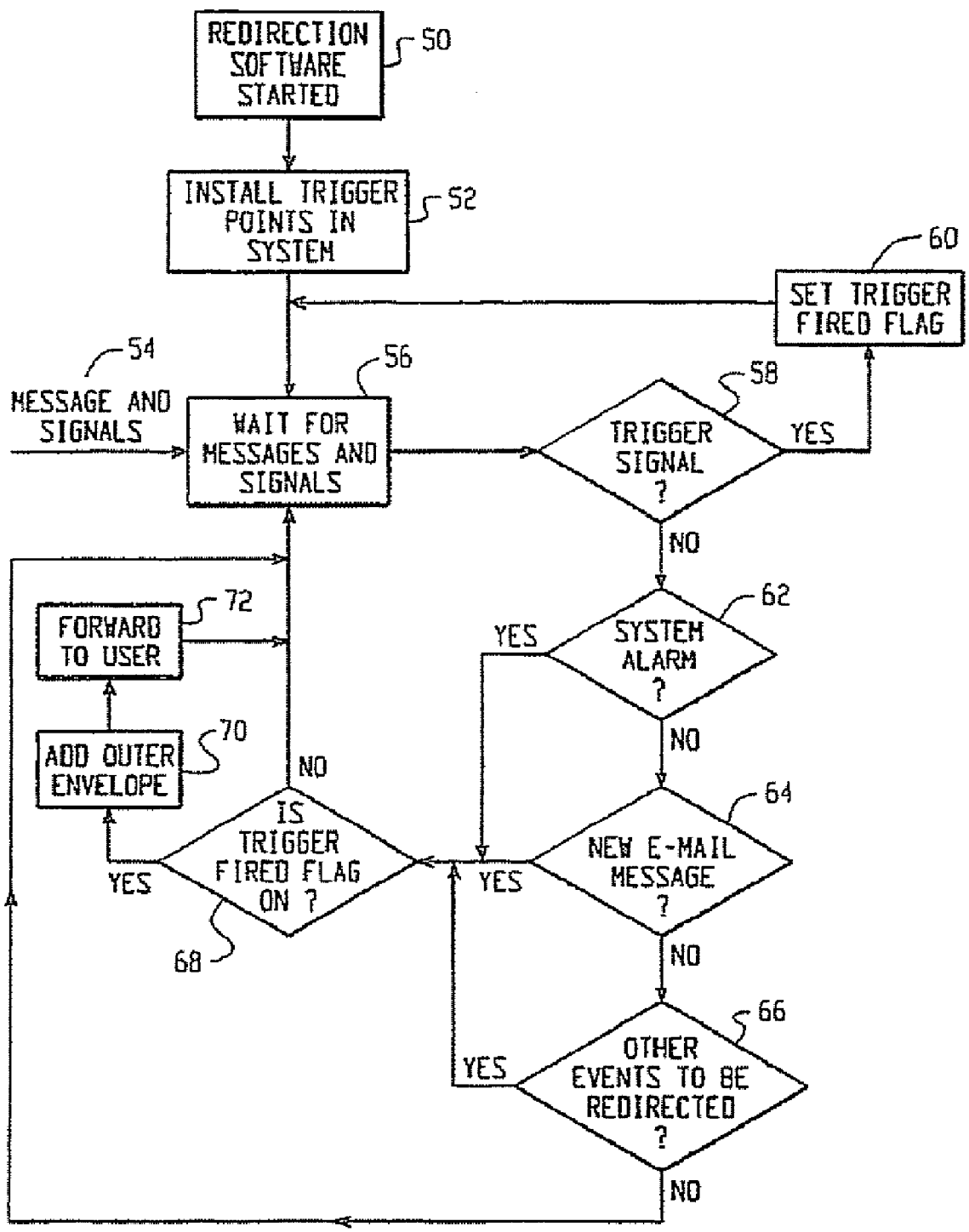
FIG. 4 is a flow chart showing the steps carried out by the redirector software operating at the host system.

In some embodiments, the mobile device 24 includes software program instructions that work in conjunction with the redirector program 12 to enable the seamless, transparent redirection of user-selected data items. FIG. 4 describes the basic method steps of the redirector program 12, and FIG. 5 describes the steps of the corresponding program operating at the mobile device 24.

In an alternative embodiment, not explicitly shown in the drawings, the mobile device 24 also includes a redirector program. In this embodiment, user selected data items can be replicated from the host to the mobile device and vice versa. The configuration and operation of the mobile device 24 having a redirector program is similar to that described herein with respect to FIGS. 1-4.

A user can configure the redirector program 12 to push certain user-selected data items to the user's mobile device 24 when the redirector 12 detects that a particular user-defined event trigger (or trigger point) has taken place. User-selected data items preferably include E-mail messages, calendar events, meeting notifications, address entries, journal entries, personal alerts, alarms, warnings, stock quotes, news bulletins, etc., but could, alternatively, include any other type of message that is transmitted to the host system 10, or that the host system 10 acquires through the use of intelligent agents, such as data that is received after the host system 10 initiates a search of a database or a website or a bulletin board. In some instances, only a portion of the data item is transmitted to the mobile device 24 in order to minimize the amount of data transmitted via the wireless network 22. In these instances, the mobile device 24 can optionally send a command message to the host system to receive more or all of the data item if the user desires to receive it.

Among the user-defined event triggers that can be detected by the redirector program 12 are, in the preferred embodiment, external events, internal events and networked events. External events preferably include: (1) receiving a command message (such as message C) from the user's mobile device to begin redirection, or to execute some other command at the host, such as a command to enable the preferred list mode, or to add or subtract a particular sender from the preferred list; (2) receiving a similar message from some external computer, and (3) sensing that the user is no longer in the vicinity of the host system; although, alternatively, an external event can be any other detectable occurrence that is external to the host system. Internal events could be a calendar alarms, screen saver activation, keyboard timeout, programmable timer, or any other user-defined event that is internal to the host system. Networked events are user-defined messages that are transmitted to the host system from another computer coupled to the host system via a network to initiate redirection. These are just some of the events that could be used to initiate replication of the user-selected data items from the host system 10 to the mobile device 24.

FIG. 1 shows an E-mail message A being communicated over LAN 14 from computer 26 to the user's desktop system 10 (also shown in FIG. 1 is an external message C, which could be an E-mail message from an Internet user, or could be a command message from the user's mobile device 24). Once the message A (or C) reaches the primary message store of the host system 10, it can be detected and acted upon by the redirection software 12. The redirection software 12 can use many methods of detecting new messages. The preferred method of detecting new messages is using Microsoft's® Messaging API (MAPI), in which programs, such as the redirector program 12, register for notifications or 'advise syncs' when changes to a mailbox take place. Other methods of detecting new messages could also be used.

Assuming that the redirector program 12 is activated, and has been configured by the user (either through the sensing of an internal, network or external event) to replicate certain user data items (including messages of type A or C) to the mobile device 24, when the message A is received at the host system 10, the redirector program 12 detects its presence and prepares the message for redirection to the mobile device 24. In preparing the message for redirection, the redirector program 12 could compress the original message A, could compress the message header, or could encrypt the entire message A to create a secure link to the mobile device 24.

Also programmed into the redirector 12 is the address of the user's mobile device 24, the type of device, and whether the device 24 can accept certain types of attachments, such as word processing or voice attachments. If the user's type of mobile device cannot accept these types of attachments, then the redirector 12 can be programmed to route the attachments to a fax or voice number where the user is located using an attached fax or voice machine 30.

The redirector may also be programmed with a preferred list mode that is configured by the user either at the host system 10, or remotely from the user's mobile device by transmitting a command message C. The preferred list contains a list of senders (other users) whose messages are to be redirected or a list of message characteristics that determine whether a message is to be redirected. If activated, the preferred list mode causes the redirector program 12 to operate like a filter, only redirecting certain user data items based on whether the data item was sent from a sender on the preferred list or has certain message characteristics that if present will trigger or suppress redirection of the message. In the example of FIG. 1, if desktop system 26 was operated by a user on the preferred list of host system 10, and the preferred list option was activated, then message A would be redirected. If, however, desktop 26 was operated by a user not on the host system's preferred list, then message A would not be redirected, even if the user of the host system had configured the redirector to push messages of type A. The user of the host system 10 can configure the preferred list directly from the desktop system, or, alternatively, the user can then send a command message (such as C) from the mobile device 24 to the desktop system 10 to activate the preferred list mode, or to add or delete certain senders or message characteristics from the preferred list that was previously configured. It should be appreciated that a redirection program could combine message characteristics and preferred sender lists to result in a more finely-tuned filter. Messages marked as low priority or that are simple return receipts or message read receipts, for example, could always be suppressed from redirection while messages from a particular sender would always be redirected.

After the redirector has determined that a particular message should be redirected, and it has prepared the message for redirection, the software 12 then sends the message A to a secondary memory store located in the mobile device 24, using whatever means are necessary. In the preferred embodiment this method is to send the message A back over the LAN 14, WAN 18, and through the wireless gateway 20 to the mobile device 24. In doing so, the redirector preferably repackages message A as an E-mail with an outer envelope B that contains the addressing information of the mobile device 24, although alternative repackaging techniques and protocols could be used, such as a TCP/IP repackaging and delivery method (most commonly used in the alternative server configuration shown in FIG. 2). The wireless gateway 20 requires this outer envelope information B in order to know where to send the redirected message A. Once the message (A in B) is received by the mobile device 24, the outer envelope B is removed and the original message A is placed in the secondary memory store within the mobile device 24. By repackaging and removing the outer envelope in this manner, the mobile computer 24 appears to be at the same physical location as the host system 10, thus creating a transparent system.

In the case where message C is representative of an external message from a computer on the Internet 18 to the host system 10, and the host 10 has been configured to redirect messages of type C, then in a similar manner to message A, message C would be repackaged with an outer envelope B and transmitted to the user's mobile device 24. In the case where message C is representative of a command message from the user's mobile device 24 to the host system 10, the command message C is not redirected, but is acted upon by the host system 10.

If the redirected user data item is an E-mail message, as described above, the user at the mobile device 24 sees the original subject, sender's address, destination address, carbon copy and blind carbon copy. When the user replies to this message, or when the user authors a new message, the software operating at the mobile device 24 adds a similar outer envelope to the reply message (or the new message) to cause the message to be routed first to the user's host system 10, which then removes the outer envelope and redirects the message to the final destination, such as back to computer 26. In the preferred embodiment this results in the outgoing redirected message from the user's host system 10 being sent using the E-mail address of the host mailbox, rather than the address of the mobile device, so that it appears to the recipient of the message that the message originated from the user's desktop system 10 rather than the mobile device. Any replies to the redirected message will then be sent to the desktop system 10, which if it is still in redirector mode, will repackage the reply and resend it to the user's mobile data device, as described above.

Figure 2:
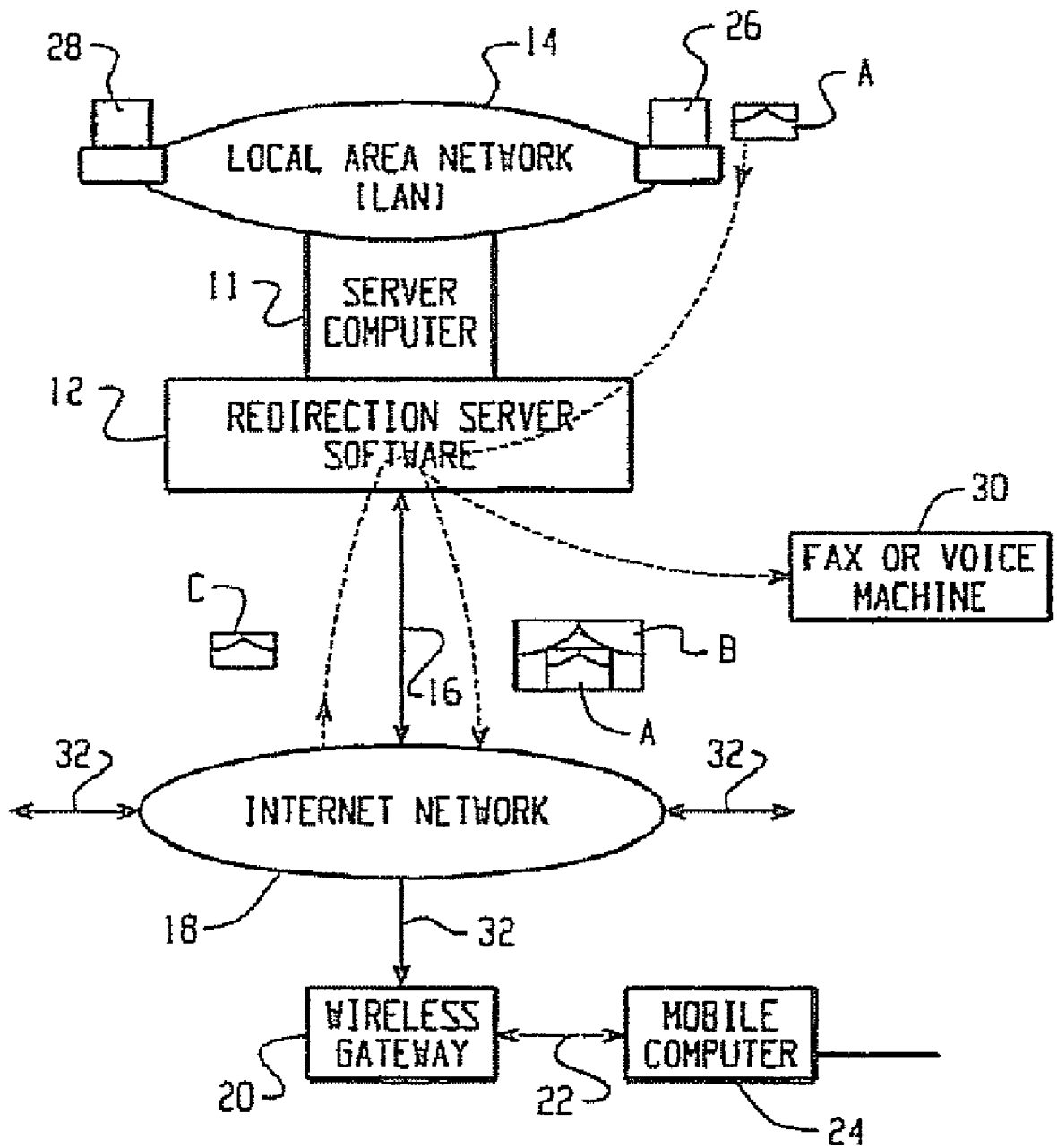
FIG. 2 is a system diagram showing the redirection of user data items from a network server (host system) to the user's mobile device, where the redirector software is operating at the server.

FIG. 2 is an alternative system diagram showing the redirection of user data items from a network server 11 to the user's mobile device 24, where the redirector software 12 is operating at the server 11. This configuration is particularly advantageous for use with message servers such as Microsoft's® Exchange Server, which is normally operated so that all user messages are kept in one central location or mailbox store on the server instead of in a store within each user's desktop PC. This configuration has the additional advantage of allowing a single system administrator to configure and keep track of all users having messages redirected. If the system includes encryption keys, these too can be kept at one place for management and update purposes.

In this alternative configuration, server 11 preferably maintains a user profile for each user's desktop system 10, 26, 28, including information such as whether a particular user can have data items redirected, which types of message and information to redirect, what events will trigger redirection, the address of the users' mobile device 24, the type of mobile device, and the user's preferred list, if any. The event triggers are preferably detected at the user's desktop system 10, 26, 28 and can be any of the external, internal or network events listed above. The desktop systems 10, 26, 28 preferably detect these events and then transmit a message to the server computer 11 via LAN 14 to initiate redirection. Although the user data items are preferably stored at the server computer 11 in this embodiment, they could, alternatively, be stored at each user's desktop system 10, 26, 28, which would then transmit them to the server computer 11 after an event has triggered redirection.

As shown in FIG. 2, desktop system 26 generates a message A that is transmitted to and stored at the host system 11, which is the network server operating the redirector program 12. The message A is for desktop system 10, but in this embodiment, user messages are stored at the network server 11. When an event occurs at desktop system 10, an event trigger is generated and transmitted to the network server 11, which then determines who the trigger is from, whether that desktop has redirection capabilities, and if so, the server (operating the redirector program) uses the stored configuration information to redirect message A to the mobile computer 24 associated with the user of desktop system 10.

As described above with reference to FIG. 1, message C could be either a command message from a user's mobile device 24, or it could be a message from an external computer, such as a computer connected to the Internet 18. If the message C is from an Internet computer to the user's desktop system 10, and the user has redirection capabilities, then the server 11 detects the message C, repackages it using electronic envelope B, and redirects the repackaged message (C in B) to the user's mobile device 24. If the message C is a command message from the user's mobile device 24, then the server 11 simply acts upon the command message.

Figure 3:
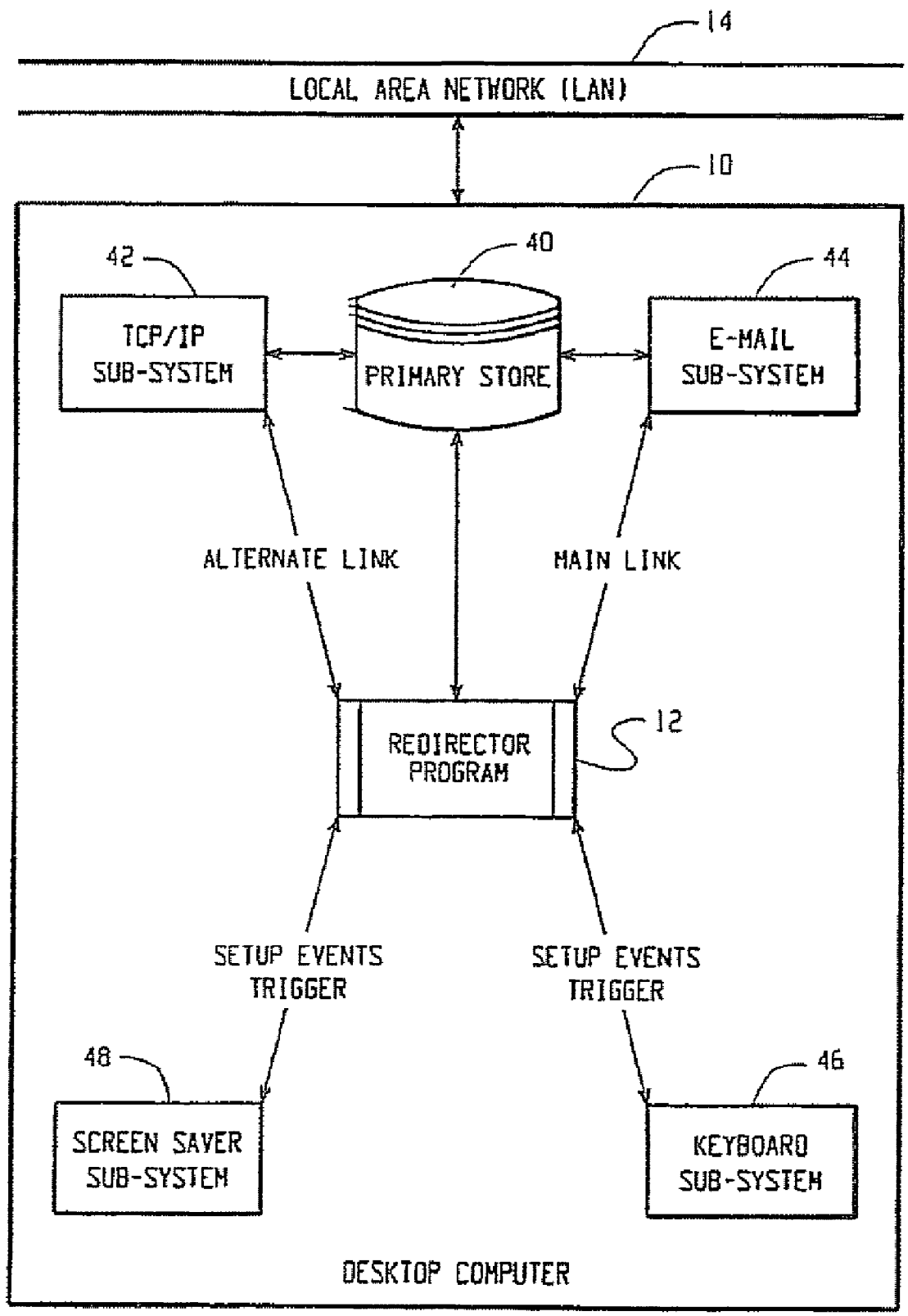
FIG. 3 is a block diagram showing the interaction of the redirector software with other components of the host system in FIG. 1 (the user's desktop PC) to enable the pushing of information from the host system to the user's mobile device.

Turning now to FIG. 3, a block diagram showing the interaction of the redirector software 12 with additional components of the host system 10 of FIG. 1 (the desktop PC) to enable more fully the pushing of information from the host system 10 to the user's mobile device 24 is set forth. These additional components are illustrative of the type of event-generating systems that can be configured and used with the redirector software 12, and of the type of repackaging systems that can be used to interface with the mobile communication device 24 to make it appear transparent to the user.

The desktop system 10 is connected to LAN 14, and can send and receive data, messages, signals, event triggers, etc., to and from other systems connected to the LAN 14 and to external networks 18, 22, such as the Internet or a wireless data network, which are also coupled to the LAN 14. In addition to the standard hardware, operating system, and application programs associated with a typical microcomputer or workstations the desktop system 10 includes the redirector program 12, a TCP/IP sub-system 42, an E-mail sub-systems 44, a primary data storage device 40, a screen saver sub-system 48, and a keyboard sub-system 46. The TCP/IP and E-mail subsystems 42, 44 are examples of repackaging systems that can be used to achieve transparency, and the screen saver and keyboard sub-systems 46, 48 are examples of event generating systems that can be configured to generate event messages or signals that trigger redirection of the user selected data items.

The method steps carried out by the redirector program 12 are described in more detail in FIG. 4. The basic functions of this program are: (1) configure and setup the user-defined event trigger points that will start redirection; (2) configure the types of user data items for redirection and optionally configure a preferred list of senders whose messages are to be redirected; (3) configure the type and capabilities of the user's mobile device; (4) receive messages and signals from the repackaging systems and the event generating systems; and (5) command and control the redirection of the user-selected data items to the mobile device via the repackaging systems. Other functions not specifically enumerated could also be integrated into this program.

The E-Mail sub-system 44 is the preferred link to repackaging the user-selected data items for transmission to the mobile device 24, and preferably uses industry standard mail protocols, such as SMTP, POP, IMAP, MIME and RFC-822, to name but a few. The E-Mail sub-system 44 can receive messages A from external computers on the LAN 14, or can receive messages C from some external network such as the Internet 18 or a wireless data communication network 22, and stores these messages in the primary data store 40. Assuming that the redirector 12 has been triggered to redirect messages of this type, the redirector detects the presence of any new messages and instructs the E-Mail system 44 to repackage the message by placing an outer wrapper B about the original message A (or C), and by providing the addressing information of the mobile device 24 on the outer wrapper B. As noted above, this outer wrapper B is removed by the mobile device 24, and the original message A (or C) is then recovered, thus making the mobile device 24 appear to be the desktop system 10.

In addition, the E-Mail sub-system 44 receives messages back from the mobile device 24 having an outer wrapper with the addressing information of the desktop system 10, and strips this information away so that the message can be routed to the proper sender of the original message A (or C). The E-Mail sub-system also receives command messages C from the mobile device 24 that are directed to the desktop system 10 to trigger redirection or to carry out some other function. The functionality of the E-Mail sub-system 44 is controlled by the redirector program 12.

The TCP/IP sub-system 42 is an alternative repackaging system. It includes all of the functionality of the E-Mail sub-system 44, but instead of repackaging the user-selected data items as standard E-mail messages, this system repackages the data items using special-purpose TCP/IP packaging techniques. This type of special-purpose sub-system is useful in situations where security and improved speed are important to the user. The provision of a special-purpose wrapper that can only be removed by special software on the mobile device 24 provides the added security, and the bypassing of E-mail store and forward systems can improve speed and real-time delivery.

As described previously, the system can be triggered to begin redirection upon detecting numerous external, internal and networked events, or trigger points. Examples of external events include: receiving a command message from the user's mobile device 24 to begin redirection; receiving a similar message from some external computer; sensing that the user is no longer in the vicinity of the host system; or any other event that is external to the host system. Internal events could be a calendar alarms, screen saver activation, keyboard timeout, programmable timer, or any other user-defined event that is internal to the host system. Networked events are user-defined messages that are transmitted to the host system from another computer that is connected to the host system via a network to initiate redirection.

The screen saver and keyboard sub-systems 46, 48 are examples of systems that are capable of generating internal events. Functionally, the redirector program 12 provides the user with the ability to configure the screen saver and keyboard systems so that under certain conditions an event trigger will be generated that can be detected by the redirector 12 to start the redirection process. For example, the screen saver system can be configured so that when the screen saver is activated, after, for example, ten (10) minutes of inactivity on the desktop system, an event trigger is transmitted to the redirector 12, which starts redirecting the previously selected user data items. In a similar manner the keyboard sub-system can be configured to generate event triggers when no key has been depressed for a particular period of time, thus indicating that redirection should commence. These are just two examples of the numerous application programs and hardware systems internal to the host system 10 that can be used to generate internal event triggers.

Figure 5:
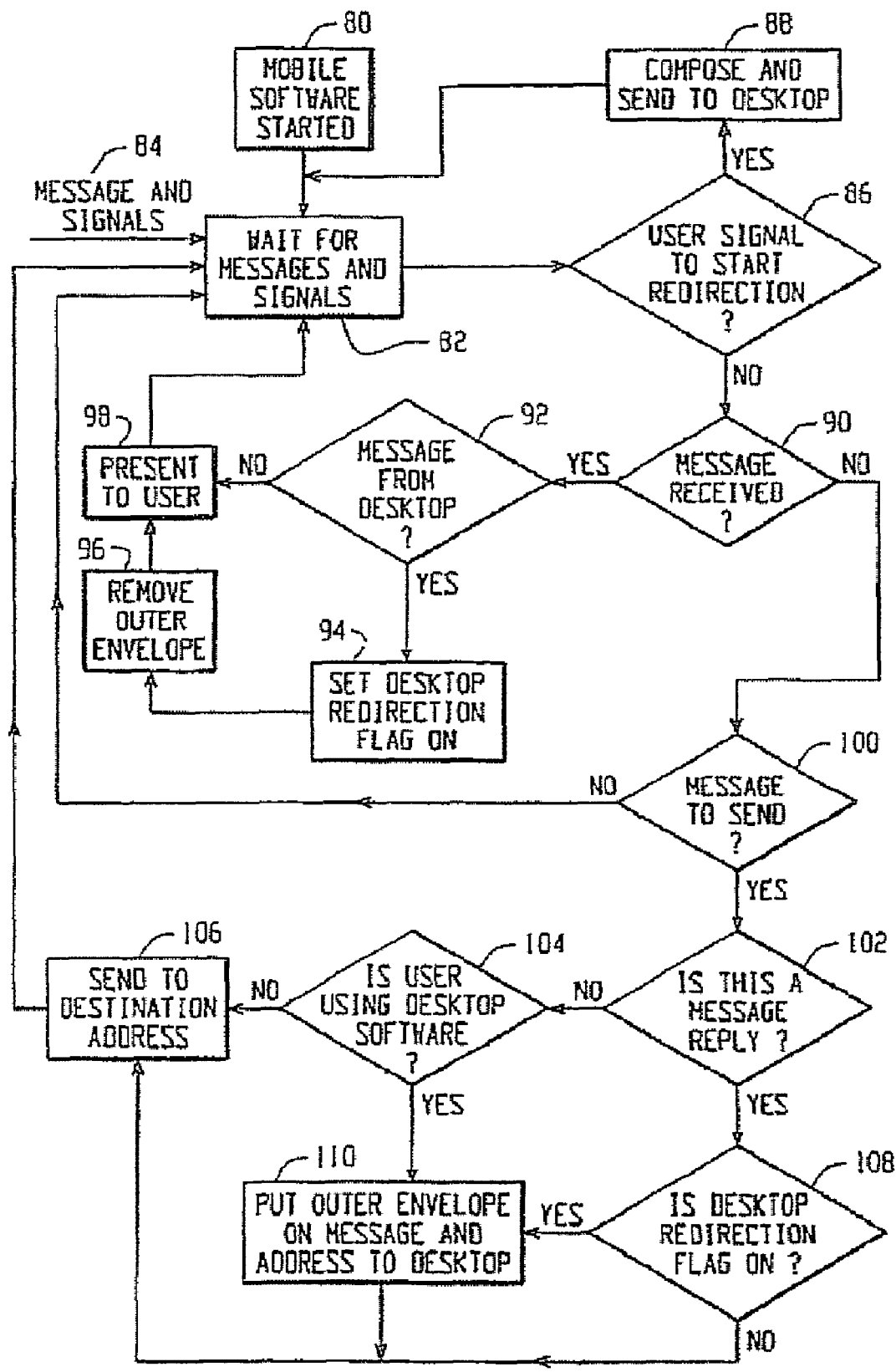
FIG. 5 is a flow chart showing the steps carried out by the mobile device to interface with the redirector software operating at the host system.

FIGS. 4 and 5, set forth, respectively, flow charts showing the steps carried out by the redirector software 12 operating at the host system 10, and the steps carried out by the mobile device 24 in order to interface with the host system. Turning first to FIG. 4, at step 50, the redirector program 12 is started and initially configured The initial configuration of the redirector 12 includes: (1) defining the event triggers that the user has determined will trigger redirection; (2) selecting the user data items for redirection; (3) selecting the repackaging sub-system, either standard E-Mail, or special-purpose technique; (4) selecting the type of data communication device, indicating whether and what type of attachments the device is capable of receiving and processing, and inputting the address of the mobile device; and (5) configuring the preferred list of user selected senders whose messages are to be redirected.

FIG. 4 sets forth the basic steps of the redirector program 12 assuming it is operating at a desktop system 10, such as shown in FIG. 1. If the redirector 12 is operating at a network server 11, as shown in FIG. 2, then additional configuration steps may be necessary to enable redirection for a particular desktop system 10, 26, 28 connected to the server, including: (1) setting up a profile for the desktop system indicating its address, events that will trigger redirection, and the data items that are to be redirected upon detecting an event; (2) maintaining a storage area at the server for the data items; and (3) storing the type of data communication device to which the desktop system's data items are to be redirected, whether and what type of attachments the device is capable of receiving and processing, and the address of the mobile device.

Once the redirector program is configured 50, the trigger points (or event triggers) are enabled at step 52. The program 12 then waits 56 for messages and signals 54 to begin the redirection process. A message could be an E-Mail message or some other user data item that may have been selected for redirection, and a signal could be a trigger signals or could be some other type of signal that has not been configured as an event trigger. When a message or signal is detected, the program determines 58 whether it is one of the trigger events that has been configured by the user to signal redirection. If so, then at step 60 a trigger flag is set, indicating that subsequently received user data items (in the form of messages) that have been selected for redirection should be pushed to the user's mobile device 24.

If the message or signal 54 is not a trigger event, the program then determines at steps 62, 68 and 66 whether the message is, respectively, a system alarm 62, an E-Mail message 64, or some other type of information that has been selected for redirection. If the message or signal is none of these three items, then control returns to step 56, where the redirector waits for additional messages 54 to act upon. If, however the message is one of these three types of information, then the program 12 determines, at step 68, whether the trigger flag has been set, indicating that the user wants these items redirected to the mobile device. If the trigger flag, is set, then at step 70, the redirector 12 causes the repackaging system (E-Mail or TCP/IP) to add the outer envelope to the user data item, and at step 72 the repackaged data item is then redirected to the user's mobile device 24 via LAN 14, WAN 18, wireless gateway 20 and wireless network 22. Control then returns to step 56 where the program waits for additional messages and signals to act upon. Although not shown explicitly in FIG. 4, after step 68, the program could, if operating in the preferred list mode, determine whether the sender of a particular data item is on the preferred list, and if not, then the program would skip over steps 70 and 72 and proceed directly back to step 56. If the sender is on the preferred list, then control would similarly pass to steps 70 and 72 for repackaging and transmission of the message from the preferred list sender.

FIG. 5 sets forth the method steps carried out by the user's mobile device 24 in order to interface to the redirector program 12. At step 80 the mobile software is started and the mobile device 24 is configured to operate with the system, including, for example, storing the address of the users desktop system 10.

At step 82, the mobile device waits for messages and signals 84 to be generated or received. Assuming that the redirector software 12 operating at the user's desktop system 10 is configured to redirect upon receiving a message from the user's mobile device 24, at step 86, the user can decide to generate a command message that will start redirection. If the user does so, then at step 88 the redirection message is composed and sent to the desktop system 10 via the wireless network 22, through the wireless gateway 20, via the Internet 18 to the LAN 14, and is finally routed to the desktop machine 10. In this situation where the mobile device 24 is sending a message directly to the desktop system 10, no outer wrapper is added to the message (such as message C in FIGS. 1 and 2). In addition to the redirection signal, the mobile device 24 could transmit any number of other commands to control the operation of the host system, and in particular the redirector program 12. For example, the mobile 24 could transmit a command to put the host system into the preferred list mode, and then could transmit additional commands to add or subtract certain senders from the preferred list. In this manner, the mobile device 24 can dynamically limit the amount of information being redirected to it by minimizing the number of senders on the preferred list. Other example commands include; (1) a message to change the configuration of the host system to enable the mobile device 24 to receive and process certain attachments; and (2) a message to instruct the host system to redirect an entire data item to the mobile device in the situation where only a portion of a particular data item has been redirected.

Turning back to FIG. 5, if the user signal or message is not a direct message to the desktop system 10 to begin redirection (or some other command), then control is passed to step 90, which determines if a message has been received. If a message is received by the mobile, and it is a message from the user's desktop 10, as determined at step 92, then at step 94 a desktop redirection flag is set "on" for this message, and control passes to step 96 where the outer envelope is removed. Following step 96, or in the situation where the message is not from the user's desktop, as determined at step 92, control passes to step 98, which displays the message for the user on the mobile device's display. The mobile unit 24 then returns to step 82 and waits for additional messages or signals.

If the mobile device 24 determines that a message has not been received at step 90, then control passes to step 100, where the mobile determines whether there is a message to send. If not, then the mobile unit returns to step 82 and waits for additional messages or signals. If there is at least one message to send, then at step 102 the mobile determines whether it is a reply message to a message that was received by the mobile unit. If the message to send is a reply message, then at step 108, the mobile determines whether the desktop redirection flag is on for this message. If the redirection flag is not on, then at step 106 the reply message is simply transmitted from the mobile device to the destination address via the wireless network 22. If however, the redirection flag is on, then at step 110 the reply message is repackaged with the outer envelope having the addressing information of the user's desktop system 10, and the repackaged message is then transmitted to the desktop system 10 at step 106. As described above, the redirector program 12 executing at the desktop system then strips the outer envelope and routes the reply message to the appropriate destination address using the address of the desktop system as the "from" field, so that to the recipient of the redirected message, it appears as though it originated from the user's desktop system rather than the mobile device.

If, at step 102, the mobile determines that the message is not a reply message, but an original message, then control passes to step 104, where the mobile determines if the user is using the redirector software 12 at the desktop system 10, by checking the mobile unit's configuration. If the user is not using the redirector software 12, then the message is simply transmitted to the destination address at step 106. If, however, the mobile determines that the user is using the redirector software 12 at the desktop system 10, then control passes to step 110 where the outer envelope is added to the message. The repackaged original message is then transmitted to the desktop system 10 at step 106, which, as described previously, strips the outer envelope and routes the message to the correct destination. Following transmission of the message at step 106, control of the mobile returns to step 82 and waits for additional messages or signals.

Figure 6:
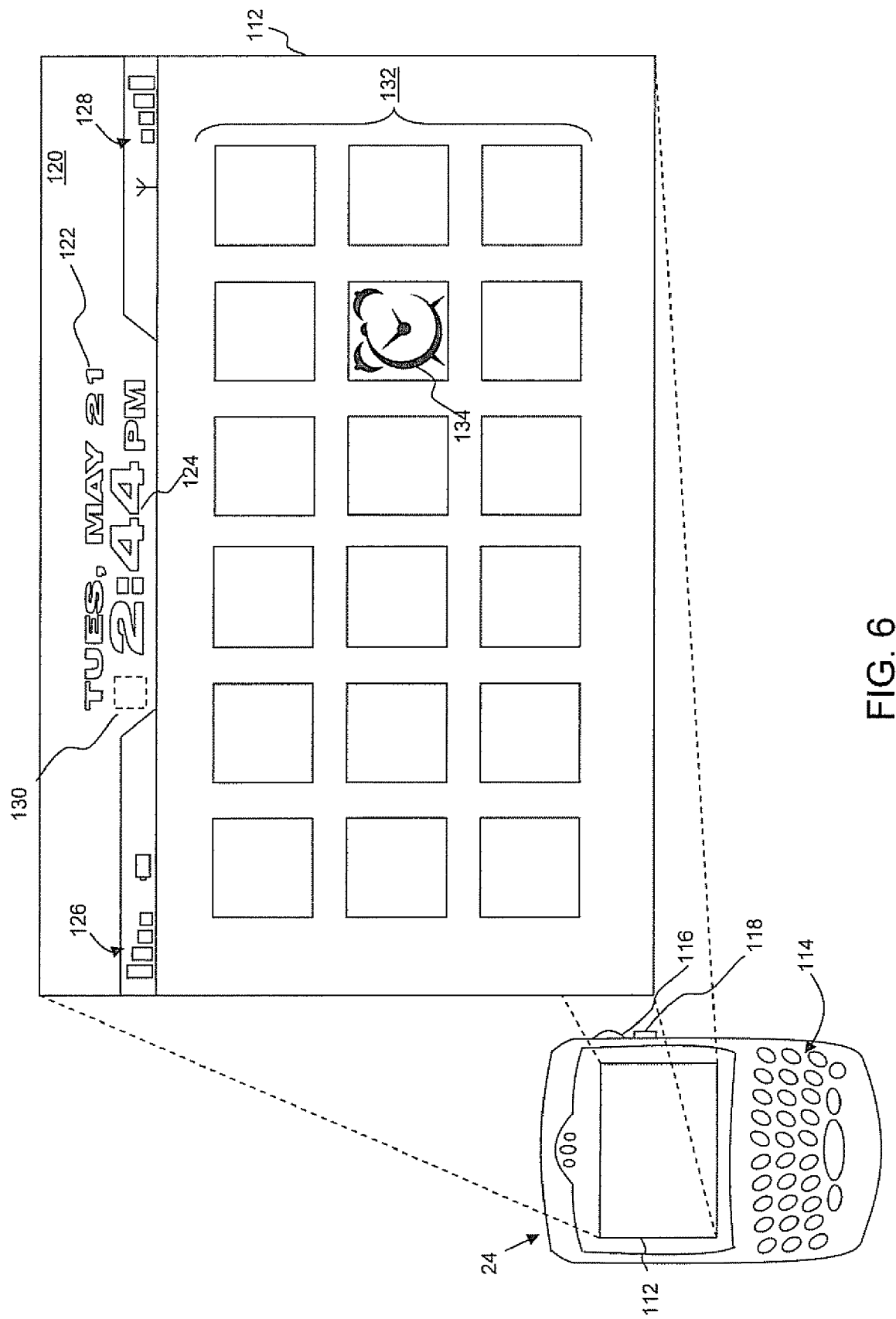
FIG. 6 is a schematic diagram of a display for a mobile device.

Devices that are used in communications systems such as that described above with respect to FIGS. 1-5 often provide personal features such as an alarm. FIG. 6 shows an exemplary mobile device 24.

The mobile device 24 generally comprises a display 112 and a cursor of view positioning device 116, such as a positioning wheel (as shown) or a trackball (not shown). A wide range of one or more positioning or cursor/view positioning mechanisms such as a touch pad, a joystick button, a mouse, a touchscreen, a tablet or other whether presently known or unknown may be employed. The mobile device 24 also comprises an escape or cancel button 118 and a keyboard 114. In this example, the keyboard 114 is disposed on the front face of the mobile device housing and positioning device 116 and cancel button 118 are disposed at the side of the housing. The keyboard 114 is in this example a standard QWERTY keyboard but instead a reduced QWERTY keyboard may instead be employed.

Positioning device 116 may serve as another input member and is both rotatable to provide selection inputs to a processor 238 (see FIG. 23) and can also be pressed in a direction generally toward housing to provide another selection input to the processor 238. The display 112 may include a cursor (not shown) that depicts generally where the next input or selection will be received.

It will be appreciated that the mobile device 24 shown in FIG. 6 is for illustrative purposes only and various other mobile devices are equally applicable to the following examples.

Figure 23:
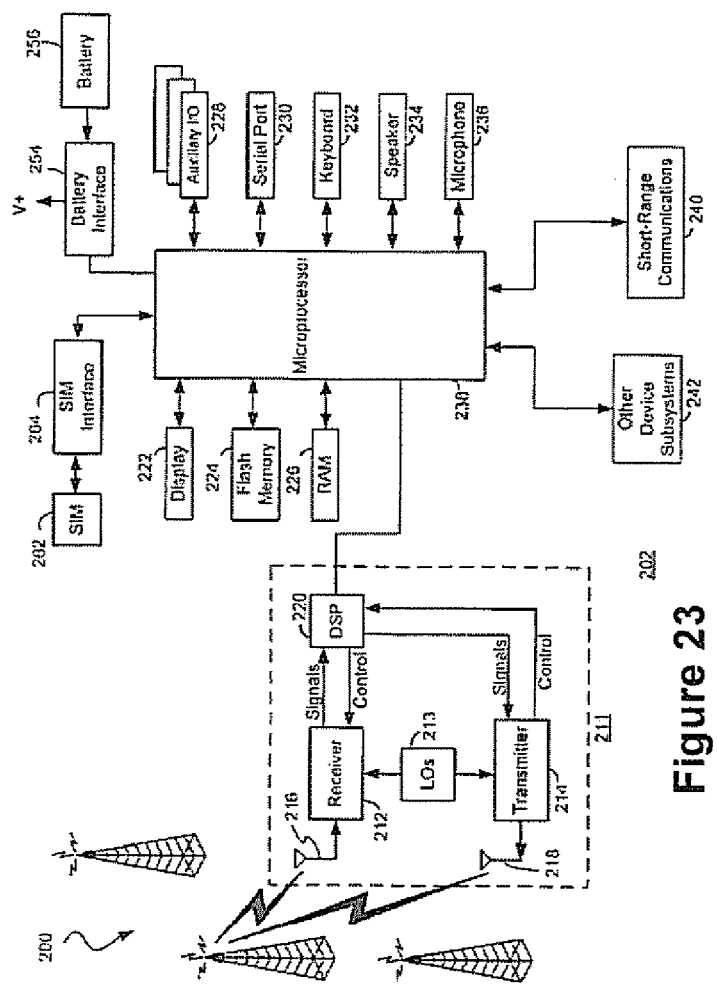
FIG. 23 is a schematic block diagram of components of the mobile device of FIG. 6.

FIG. 23 is a detailed block diagram of a preferred mobile station 202 of the present disclosure. The term "mobile station" will herein refer to the operable components of, e.g. mobile device 24. Mobile station 202 is preferably a two-way communication device having at least voice and advanced data communication capabilities, including the capability to communicate with other computer systems. Depending on the functionality provided by mobile station 202, it may be referred to as a data messaging device, a two-way pager, a cellular telephone with data messaging capabilities, a wireless Internet appliance, or a data communication device (with or without telephony capabilities)—e.g. mobile device 24 shown in FIG. 6. Mobile station 202 may communicate with any one of a plurality of fixed transceiver stations 200 within its geographic coverage area.

Mobile station 202 will normally incorporate a communication subsystem 211 which includes a receiver 212, a transmitter 214, and associated components such as one or more (preferably embedded or internal) antenna elements 216 and 218, local oscillators (LOs) 213, and a processing module such as a digital signal processor (DSP) 220. As will be apparent to those skilled in field of communications, particular design of communication subsystem 211 depends on the communication network in which mobile station 202 is intended to operate.

Mobile station 202 may send and receive communication signals over a network after required network registration or activation procedures have been completed. Signals received by antenna 216 through the network are input to receiver 212, which may perform such common receiver functions as signal amplification, frequency down conversion filtering, channel selection, and like, and in example shown in FIG. 23, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Network access is associated with a subscriber or user of mobile station 202, and therefore mobile station 202 requires a Subscriber Identity Module or "SIM" card 262 to be inserted in a SIM interface 264 in order to operate in the network. SIM 262 is one type of a conventional "smart card" used to identify an end user (or subscriber) of the mobile station 202 and to personalize the device, among other things. Without SIM 262, the mobile station terminal is not fully operational for communication through a wireless network. By inserting SIM 262 into mobile station 202, an end user can have access to any and all of his/her subscribed services. SIM 262 generally includes a processor and memory for storing information. Since SIM 262 is coupled to a SIM interface 264, it is coupled to microprocessor 238 through communication lines. In order to identify the subscriber, SIM 262 contains some user parameters such as an International Mobile Subscriber Identity (IMSI). An advantage of using SIM 262 is that end users are not necessarily bound by any single physical mobile station. SIM 262 may store additional user information for the mobile station as well, including datebook (or calendar) information and recent call information.

Mobile station 202 is a battery-powered device so it also includes a battery interface 254 for receiving one or more rechargeable batteries 256. Such a battery 256 provides electrical power to most if not all electrical circuitry in mobile station 202, and battery interface 254 provides for a mechanical and electrical connection for it. The battery interface 254 is coupled to a regulator (not shown) which provides a regulated voltage V to all of the circuitry.

Mobile station 202 includes a microprocessor 238 which controls overall operation of mobile station 202. Communication functions, including at least data and voice communications are performed through communication subsystem 211. Microprocessor 238 also interacts with additional device subsystems such as a display 222, a flash memory 224, a random access memory (RAM) 226, auxiliary input/output subsystems 228, a serial port 230, a keyboard 232, a speaker 234, a microphone 236, a short-range communications subsystem 240, and any other device subsystems generally designated at 242. Some of the subsystems shown in FIG. 23 perform communication-related functions, whereas other subsystems may provide "resident" or on-device functions. Notably, some subsystems such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications which control basic device operations, including at least data and voice communication applications, as well as the inventive functionality of the present disclosure, will normally be installed on mobile station 202 during its manufacture. A preferred application that may be loaded onto mobile station 202 may be a personal information manager (PIM) application having the ability to organize and manage data items relating to user such as, but not limited to, e-mail, calendar events, voice mails, appointments, and task items. Naturally, one or more memory stores are available on mobile station 202 and SIM 262 to facilitate storage of PIM data items and other information.

The PIM application preferably has the ability to send and receive data items via the wireless network. In the present disclosure, PIM data items are seamlessly integrated, synchronized, and updated via the wireless network, with the mobile station user's corresponding data items stored and/or associated with a host computer system thereby creating a mirrored host computer on mobile station 202 with respect to such items. This is especially advantageous where the host computer system is the mobile station user's office computer system. Additional applications may also be loaded onto mobile station 202 through network, an auxiliary subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile station 202 and may provide enhanced on-device functions, communication-related functions, or both. For example, secure communication applications may enable electronic commerce functions and other such financial transactions to be performed using mobile station 202.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of mobile station 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 23 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication.

Short-range communications subsystem 240 of FIG. 23 is an additional optional component which provides for communication between mobile station 202 and different systems or devices, which need not necessarily be similar devices. For example, subsystem 240 may include an infrared device and associated circuits and components, or a Bluetooth™ communication module to provide for communication with similarly enabled systems and devices. Bluetooth™ is a registered trademark of Bluetooth SIG, Inc.

Turning back to FIG. 6, the mobile device 24 displays a status region 120 and a series of icons 132 for accessing each visible application available for use on the mobile device 10 for providing features to the user. A visible application is generally one that has not been hidden by the user. The status region 120 comprises a centrally located date display 122 and time display 124, both flanked by a battery status display 126 and signal strength display 128. The status region 120 also comprises an alarm indicator region 130 delimited by a dashed line in FIG. 6. It will be appreciated that the dashed line is shown in FIG. 6 only for illustrative and identification purposes and would preferably not be included in the status region 120. In FIG. 6, the area surrounded by the dashed line is empty or "cleared", indicating that the alarm option has been set to be "off" and thus will not activate at any time on any date.

In FIG. 6, an alarm icon 134 is shown amongst the series of icons 132. By selecting the alarm icon 134, an alarm application 146 is accessed by the processor, which will be explained in greater detail below. An alarm indicator algorithm 442 stored in memory 224 on the mobile device 24 (see FIG. 24) operates according to the settings selected in the alarm application 146 to update and display an alarm indicator in the alarm indicator display region 130 according to the current settings. One or more of the series of icons 132 may be a folder (not shown) that itself is capable of organizing any number of applications or files therewithin.

Figure 24:
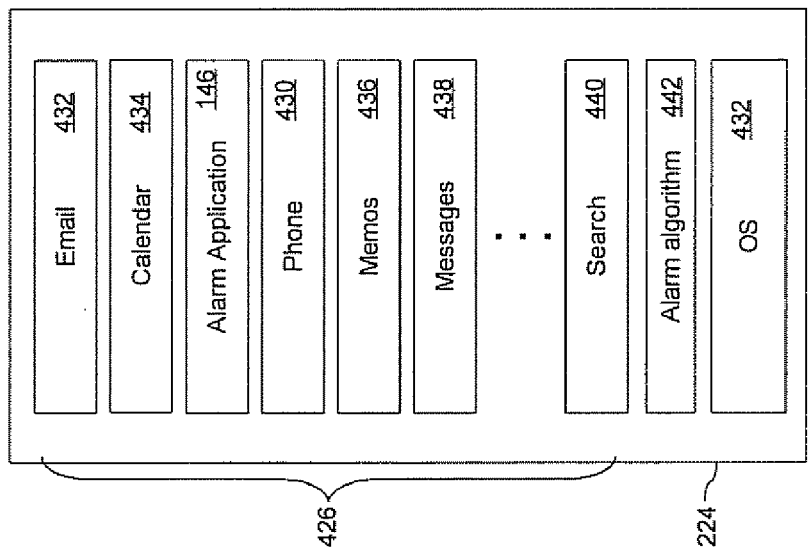
FIG. 24 is a schematic block diagram of the memory shown in FIG. 23.

As shown in FIG. 24, memory 224 includes a plurality of applications 426 associated with the series of icons 134 for the processing of data. Applications 426 may be any variety of forms such as, without limitation, software, firmware, and the like. Applications 426 may include, for example, the alarm application 146, electronic mail (e-mail) 432, calendar program 434, phone application 430, memo program 436, messages 438, search 440 etc. An operating system (OS) 432 also resides in memory 224. It can also be seen from FIG. 24 that the alarm indicator algorithm 442 also resides in memory 224.

In FIG. 6, the "home" screen output is currently active and constitutes the main "ribbon" application for displaying the icons 134 shown. An application, such as alarm application 146 of FIG. 24 may then be initiated (opened or viewed) from display by providing a suitable user input to it. For example, alarm application 146 may be initiated (opened or viewed) by rotating positioning device 116 to highlight the alarm icon 134 and providing a selection input by translating positioning device 116.

Movement, navigation, and/or scrolling with use of a cursor/view positioning mechanism is beneficial given the relatively large size of visually displayed information and the compact size of display 112, and since information and messages are typically only partially presented in the limited view of display 112 at any given moment. As previously described, positioning device 116 is one helpful cursor/view positioning mechanism to achieve such movement. Positioning device 116, which may be referred to as a scrollwheel or scroll device, may include a circular disc which is rotatable about a fixed axis of housing, and may be rotated by the end user's index finger or thumb (as shown) or, as noted above, may be a trackball (not shown) or any other type of positioning mechanism.

Figure 7A:
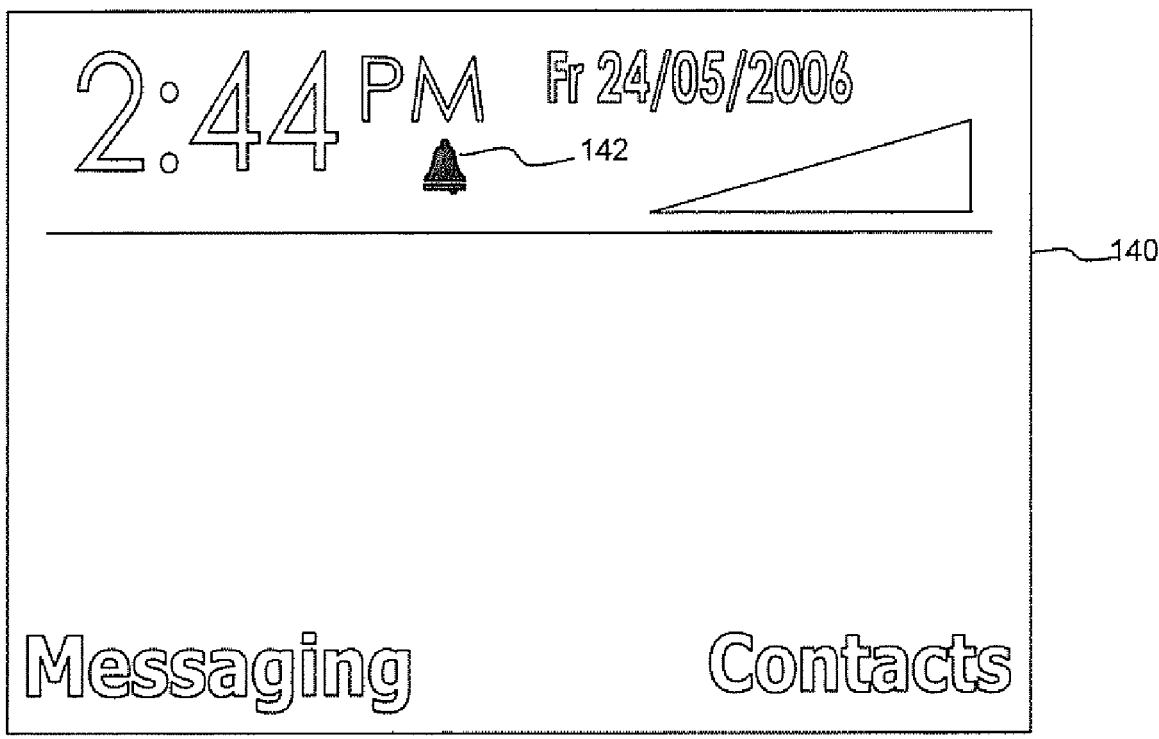
Figure 7B:
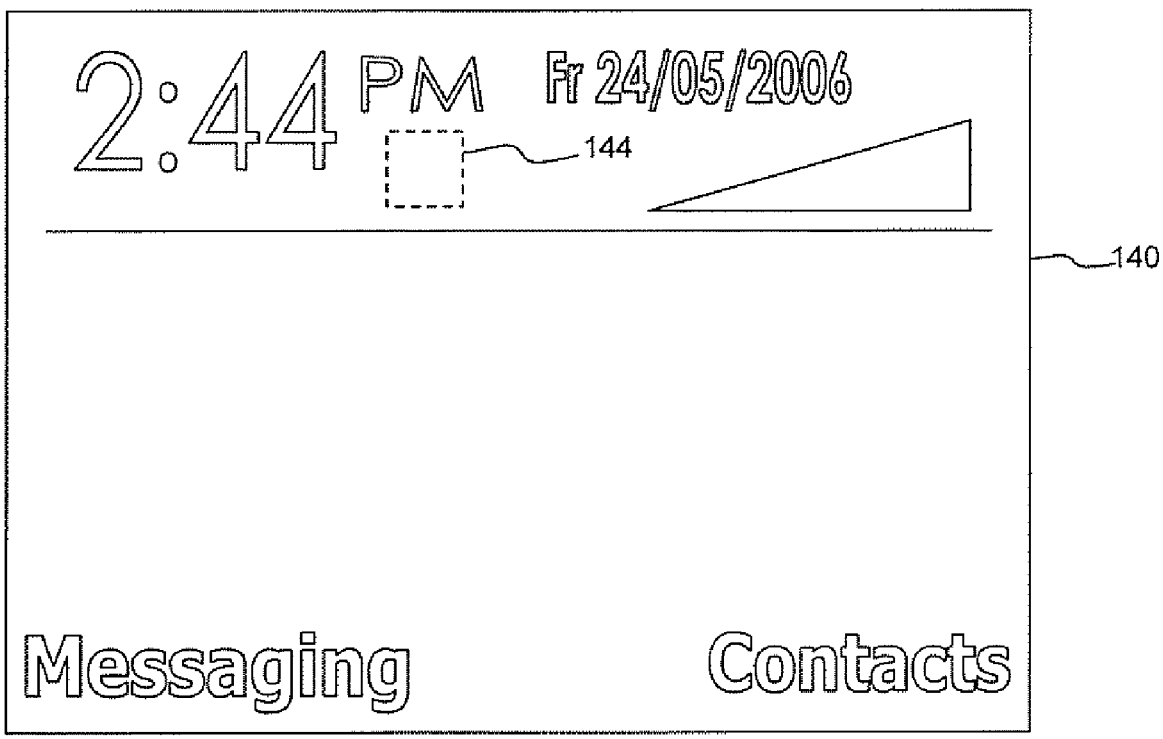

For previous, binary alarm indicators, a user who wishes to determine whether or not a alarm will be activated the next morning, most notably where the alarm is active on certain days of the week and not on others, would typically derive little useful information from a traditional binary alarm indicator alone. A display 140 utilizing a binary alarm indicator graphic 142 is shown in FIGS. 7(a) and 7(b). In FIG. 7(a), the graphic 142 is always displayed when the alarm feature has been set to go off at some time. In FIG. 7(b), an empty region 144 indicates that the alarm feature has not been set or is "off" and thus the graphic 142 is not displayed.

Referring to the display 140 in FIGS. 7(*a*) and 7(*b*), the user, whereupon seeing the graphic 142 displayed on the eve of a weekend day, may assume that the intended alarm settings are activated. However, if the device utilizing display 140 includes an option for the alarm to be suppressed for a predetermined time period, e.g. on weekends, the presence of the graphic 142 would not be determinative of whether or not the alarm will actually go off the next day since it is "active" but will not go off during this time period.

Alternatively, the user may believe that the alarm will not go off on the weekend (e.g. per their usual preferences) but this feature has in fact been set to go off on weekends. Unintended alarm schemes may result in the user waking too early when it is not required to do so, or in even less desirable case, to miss a pre-scheduled waking time.

To avoid confusion, the user typically accesses an alarm menu or application on the device (not shown in FIG. 7) to view the alarm settings and confirm that the settings are correct, for example, selecting alarm icon 134 of FIG. 6 using an appropriate input or selection mechanism, such as positioning device 116 of FIG. 6. However, the multiple steps involved in checking the alarm settings each time the user wishes to confirm their settings may become an inconvenience to users who use the alarm daily.

To overcome the drawbacks of previous binary alarm schemes for displaying an alarm graphic 142, the alarm indicator region 130 shown in FIG. 6 is updated on the display 112 by the processor 238 using the alarm algorithm 442, to more intelligently convey the status for multiple (three or more) alarm states. In general, the alarm indicator region 130 visually distinguishes between when an alarm is on or "active" and when the alarm is active but is suppressed for a predetermined time period, by displaying different versions of a visual alarm indicator, where the versions are visually distinguishable from each other. In the result, three or more states representing numerous combinations of options can be displayed by the processor 238. The alarm application 146 is initiated and loaded by the processor 238 by a user selecting the alarm icon 134. A screen shot of the alarm application 146 is shown in FIG. 8(*a*).

The alarm application 146 provides the user with a number of options for setting an alarm. In this example, an alarm type option 148 enables the user to select a daily alarm, a multi alarm and to turn off the alarm entirely. The daily alarm option provides a single alarm per day, and the multi-alarm option provides more than one alarm time that can be selectively set for each day of the week. FIG. 8(*a*) exemplifies when the alarm option 148 is set to be "off". For this state, the alarm indicator region 130 is cleared by the processor 238 (i.e. the alarm indicator graphic is visually absent, concealed or otherwise completely or substantially removed) and a user may then be aware of the fact that no alarms will go off unless they access the application 146 and change this option 148. FIG. 9 exemplifies when the alarm option 148 is set to "daily" and a "bell-like" graphic 164 is displayed in the alarm indicator region 130. In this state, the user knows that an upcoming alarm is pending.

A time selection option 150 is also provided, which enables the user to select the time at which the alarm will go off, in particular, when the alarm type option 148 is set to be "daily". Preferably, the user is able to set the option 150 when the alarm type option 148 is set to be "off" so that it is pre-set for a later time when the option is changed to "daily". The time for an alarm is stored in memory 224 and the alarm algorithm 442 operates according to this stored time as will be explained in greater detail below. Alternatively, the time option 150 can be "greyed out" when the alarm is off, however, preferably the user can set the alarm time 150 even if the alarm is not going to be turned on. Typically, the time option 150 is changed by the user highlighting and selecting the option 150 using the positioning device 116 and then entering or selecting a time. Alternatively, the time option 150 can be set using the keyboard 114, remotely via the communication system shown in FIGS. 1-5 or in any other suitable manner. When using the communication system in FIGS. 1-5, the device 24 can receive instructions from a remote server and/or application to change the alarm. For example, the instructions may be in the form of a data packet transmitted from a remote server accessible by, e.g. the desktop computer 10.

Figure 8A:
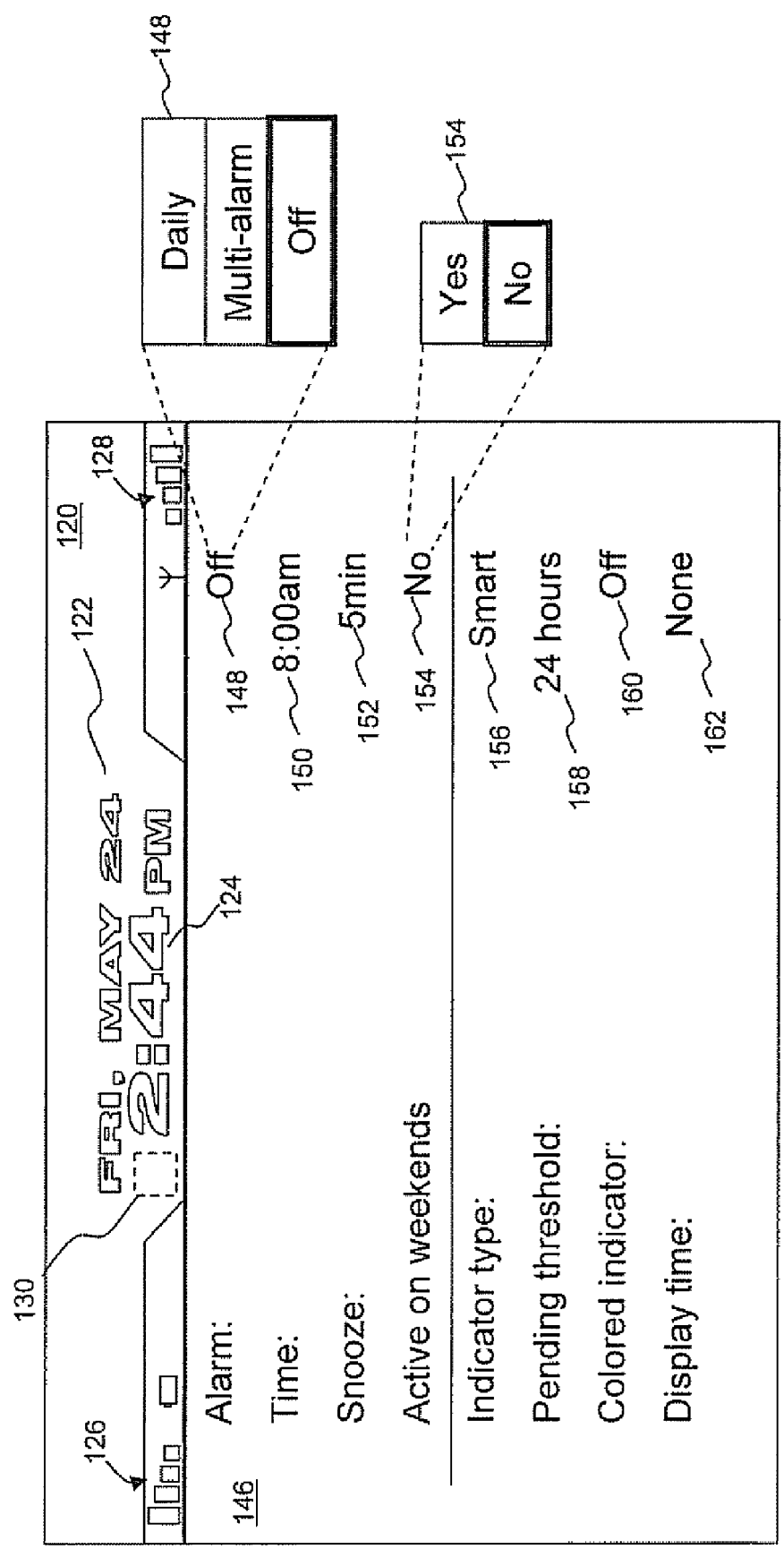
FIG. 8(*a*) is an alarm menu showing selection options.
Figure 8B:
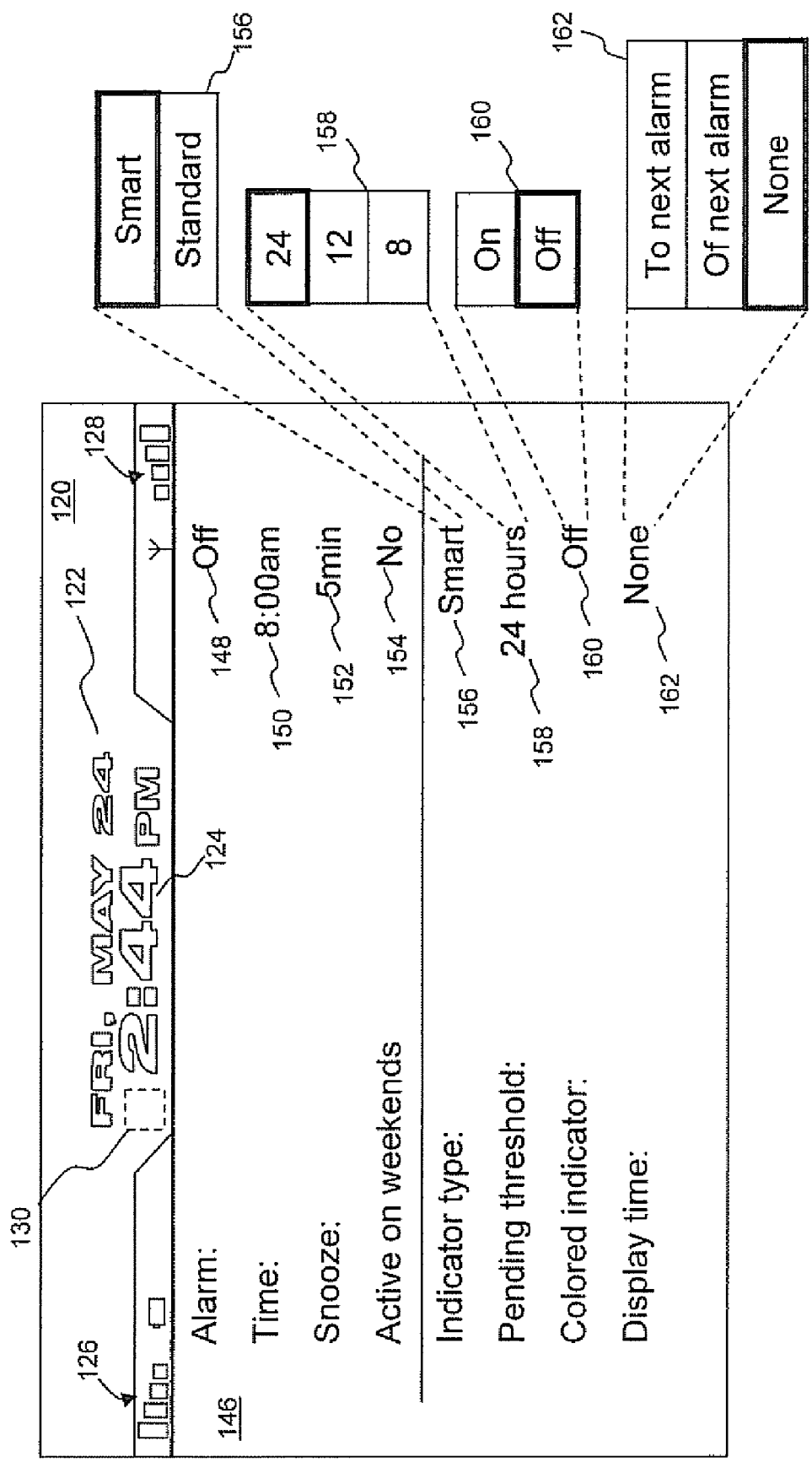
Figure 9:
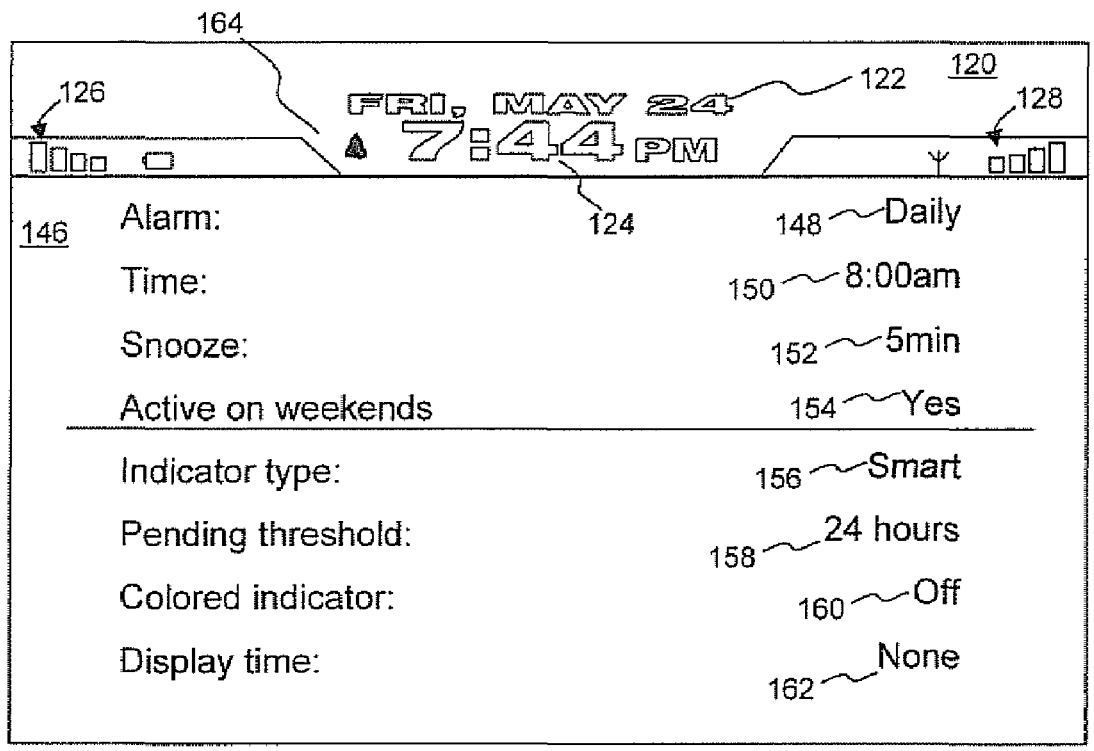
FIG. 9 is an alarm menu showing an alarm indicator when the alarm is on and active for the next day.

A snooze option 152 is also shown in FIG. 8(*a*). The snooze option 152 is preferably selectable and although not shown, provides a number of snooze periods, such as 5 min (setting shown), 10 min, 15 min etc. Alternatively, the user may be afforded the option of entering a more specific snooze period such as 7 min etc.

Figure 10:
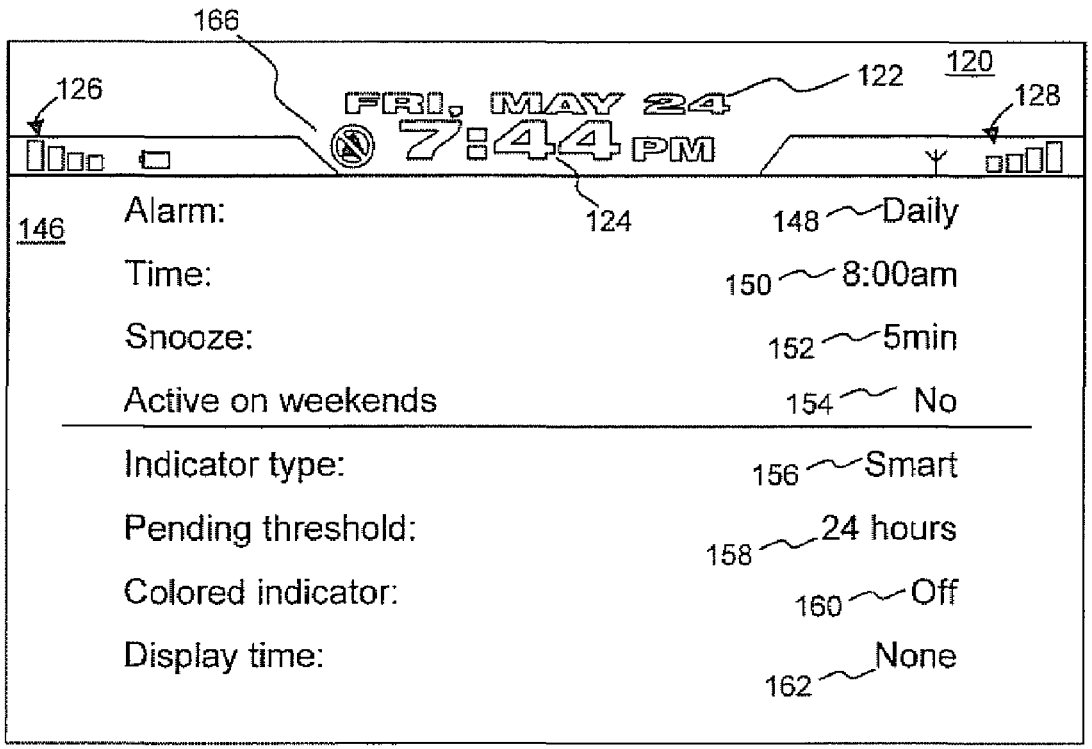
FIG. 10 is the alarm menu of FIG. 9 showing the alarm indicator when the alarm is on and not active for the next day.

A weekend alarm option 154 is also shown and, in FIG. 8(*a*) is set to be "No" meaning that even if the alarm is set to be "on", an alarm will not activate on Saturday or Sunday. FIG. 9 exemplifies where the weekend alarm option 154 is set to "yes", meaning that the bell graphic 164 will continually be displayed since the daily alarm is on and the alarm will go off on each day of the week. FIG. 10 exemplifies where the daily alarm is set but the alarm is not active on weekends. As shown in FIG. 10, the current time 124 displayed is on Friday evening and thus a crossed-out bell graphic 166 is shown to indicate that the alarm is on but will not go off on Saturday, which is the next day. The times at which the alarm indicator region 130 changes from the graphic 164 to the crossed-out bell graphic 166, can be selectively controlled (not shown) but preferably updates at set time intervals, or according to a trigger event, such as immediately after the previous alarm. In such a case, the crossed-out bell graphic 166 would be displayed after the 8:00 am alarm goes off on Friday morning.

FIG. 8(*b*) illustrates additional options provided by the alarm application 146. An indicator type option 156 enables the user to choose between the smart indicator which intelligently updates the alarm indicator display 130 as will be described, and a traditional binary alarm indicator. It will be appreciated that the smart indicator is preferred due to its ability to update the status region 120 based on more than two states. However, a traditional binary display may also be provided as an option.

A pending threshold option 158 is also provided, which enables the user to select the refresh period for showing the next alarm. In FIG. 8(*b*), this option is set to "24 hours", which means that the alarm indicator algorithm 442 will "look ahead" 24 hours to determine how to update certain display options for the alarm indicator region 130 as will be explained below. Other thresholds can be used, as exemplified in FIG. 8(*b*), e.g. 12 hours, 8 hours etc.

Figure 12:
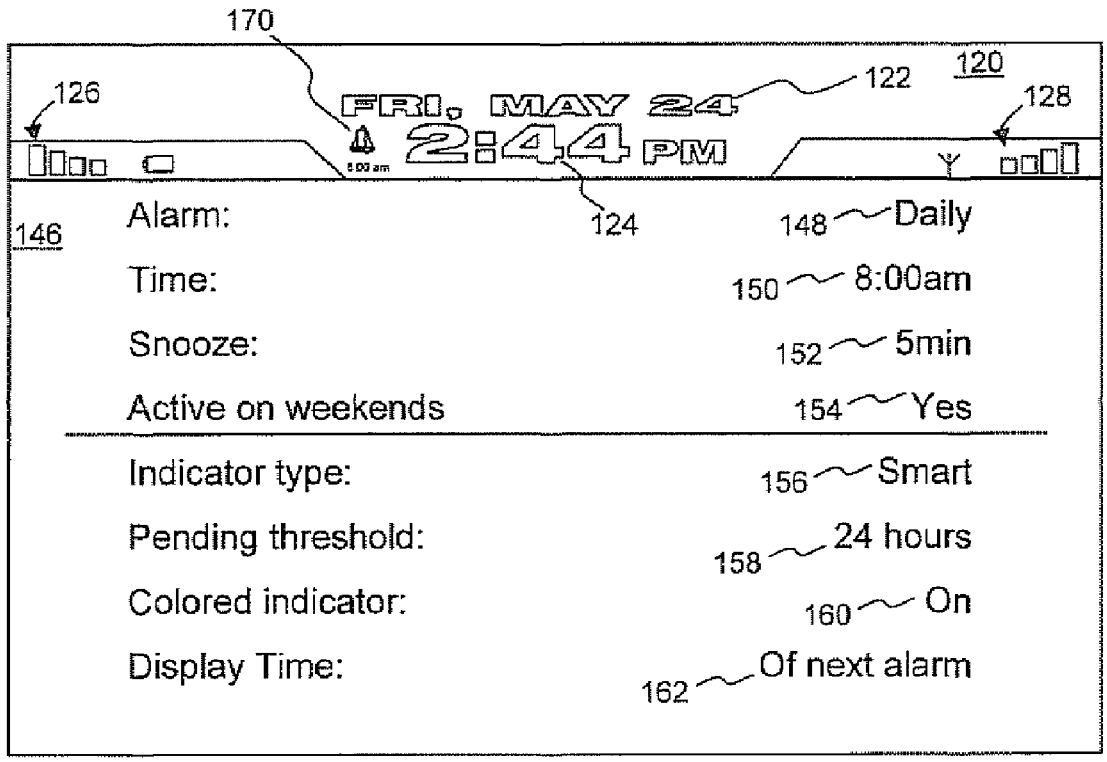
FIG. 12 is the alarm menu of FIG. 9 showing the alarm indicator displaying the time of the next alarm with a coloured indicator.

A coloured indicator option 160 is also provided, which can be turned on or off by the user. The coloured indicator option 160 enables the use of colour where applicable to further distinguish alarm states. FIG. 12 shows a bell graphic 170 with a hatch pattern representing a different colour than the bell graphic 164. The hatch pattern of bell graphic 170 may represent, e.g., a weekday alarm, whereas the solid bell graphic 164 may represent another colour for a weekend alarm.

Figure 11:
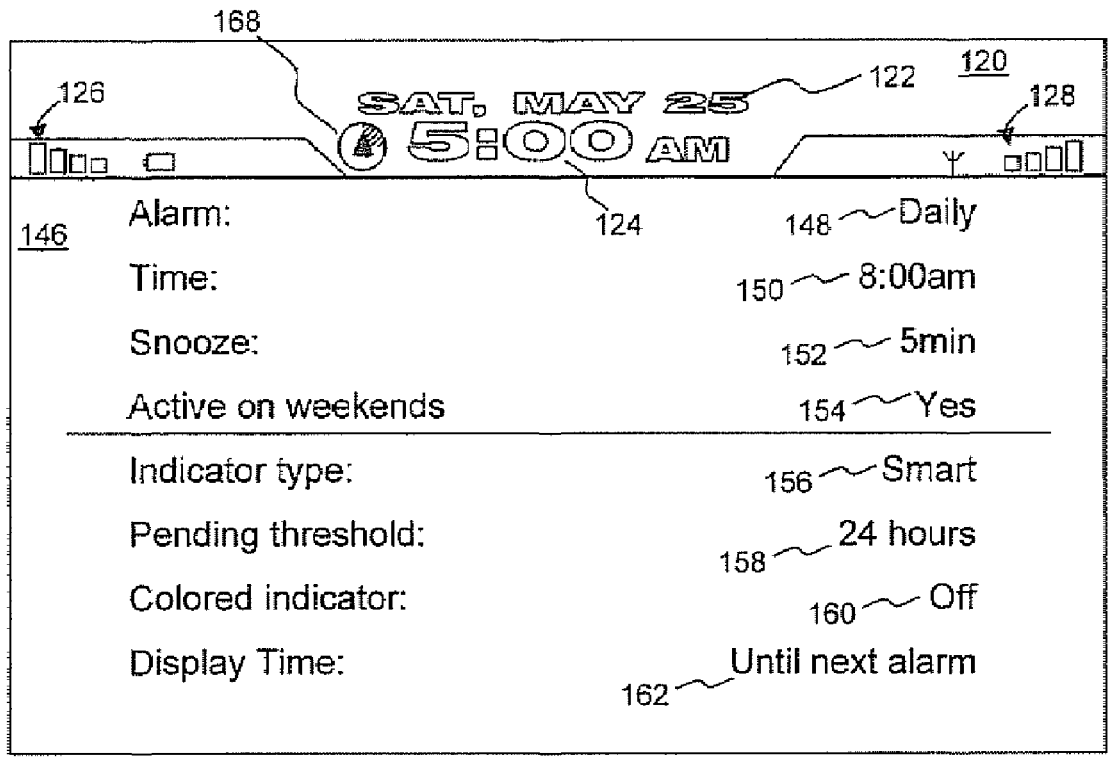
FIG. 11 is the alarm menu of FIG. 9 showing the alarm indicator displaying the time until the next alarm.

A display time option 162 is also provided, which enables the user to provide an additional visual cue to determine the nature of the next alarm. In FIG. 8(*b*), the option 162 is set to "None", which means that the additional cue will not be included in the graphic. When the option 162 is set as "Until next alarm", as shown in FIG. 11, a combined bell icon and surrounding stopwatch icon 168 is displayed ill region 130 by the processor 238, wherein a coloured portion of the stopwatch indicates the number of hours until the next alarm will go off, based on a 12 hour clock. Typically, the stopwatch icon 168 will show a full 12 hours remaining until less than 12 hours remains. When this option is set, the processor 238 operating according to the alarm indicator algorithm 442 will periodically refresh the alarm indicator region 130 to update the status. When the option 162 is set to "Of next alarm", as shown in FIG. 12, a combined bell icon and textual time label 170 can be used. The textual label displays the exact time at which the next alarm will go off. According to the settings shown in FIG. 12, the label will always read 8:00 am since the daily alarm is set and will go off on weekends. The textual label 170 is particularly useful as the user will be able to immediately discern the time at which the next alarm will go off.

Figure 13:
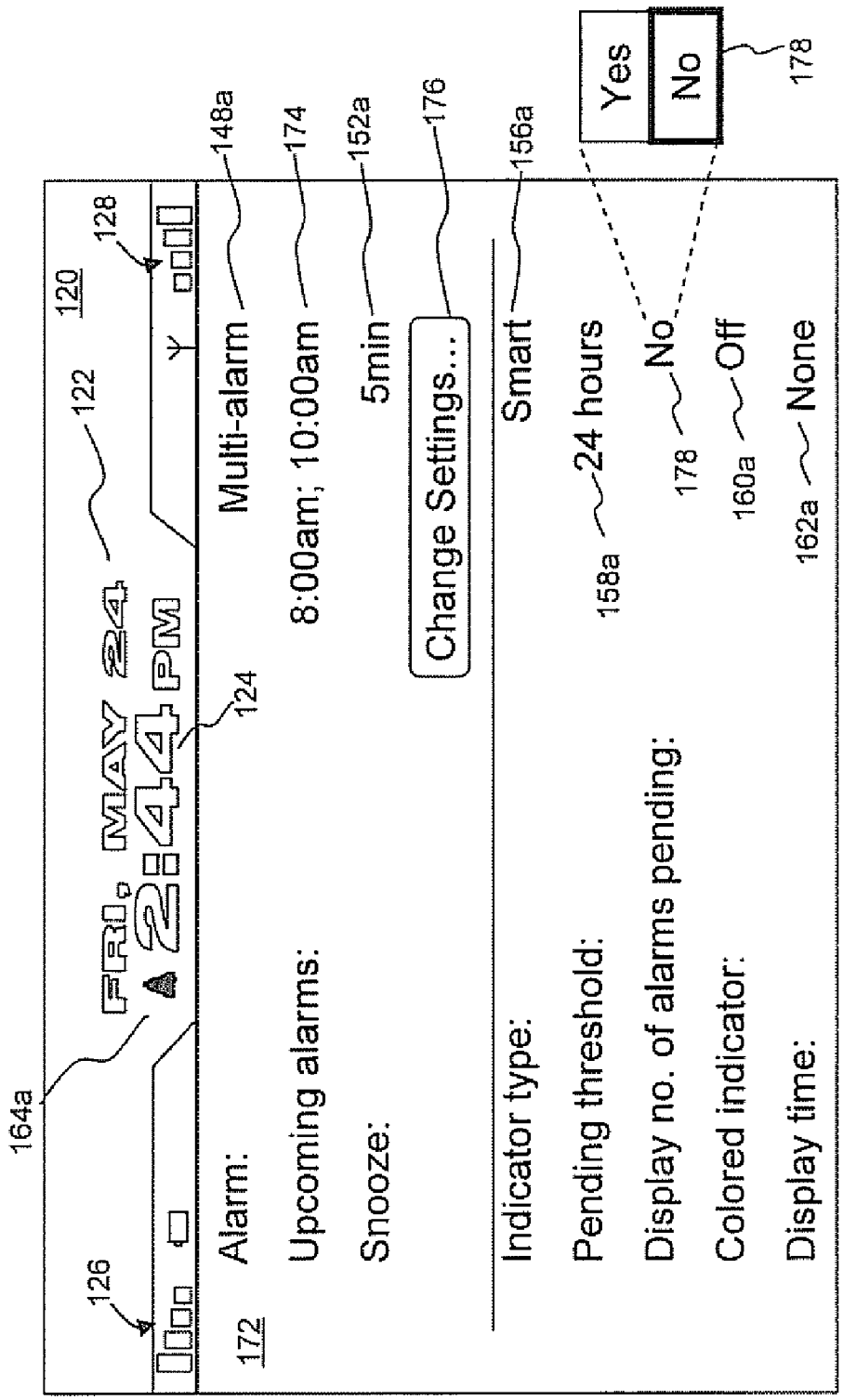
FIG. 13 is another alarm menu displayed in a multi-alarm mode.

If the user chooses to select "Multi-alarm" in the alarm type option 148a, preferably, a multi-alarm menu 172 such as that shown in FIG. 13 is loaded with additional options for setting multiple alarms. The alarm type indicator 148a is refreshed to show that the multi-alarm option has been chosen and enables the user to change back to daily alarms or to turn alarms off.

Figure 14:
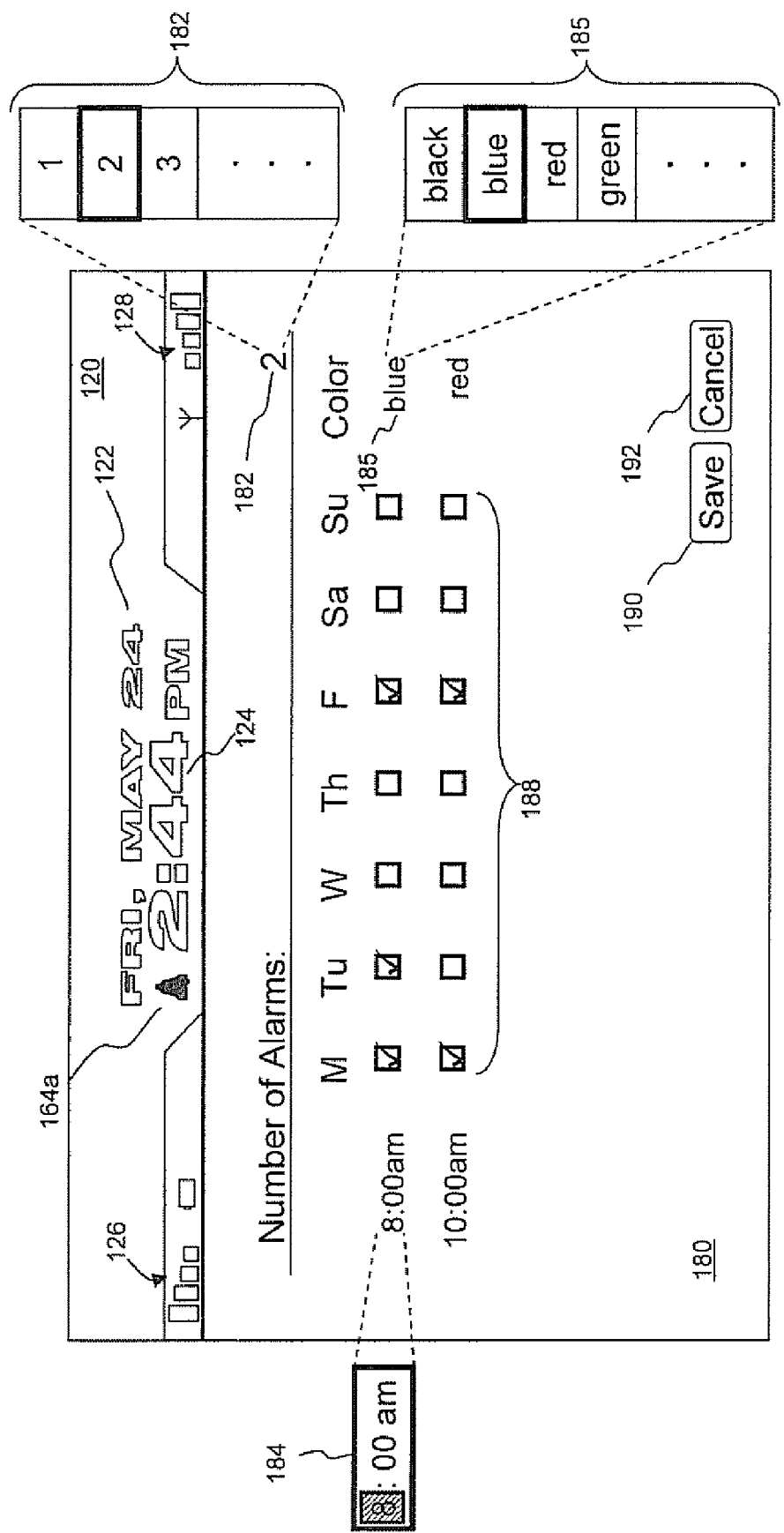
FIG. 14 is menu for selecting settings in the multi-alarm mode.

The multi-alarm menu 172 displays an upcoming alarms list 174, which lists all of the alarms that will go off within the pending threshold. A snooze option 152a and a "Change Settings" button 176 are provided to enable the user to select change the settings for a multi-alarm. By selecting the Change Settings button 176, preferably, a selection menu 180 such as that shown in FIG. 14 is loaded.

The selection menu 180 provides the user with a number of options for setting multiple alarms on multiple days. A number of alarms option 182 is provided for the user to select the number of alarms to be set. The selection menu 180 provides a number of rows corresponding to the number of alarms selected, with each row providing selectable options for a respective one of the multiple alarms.

A alarm time option 184 is provided for each row. The time option 184 can be changed similar to the time option 150 for a daily alarm, e.g. using the positioning device 116, the keyboard 114, remotely via the communication system shown in FIGS. 1-5 or in any other suitable manner, and indicates the time at which the respective alarm is set to go off. Typically, each alarm in the multi-alarm mode will indicate a different time, however this is not necessary.

In the example shown, a set of seven (7) checkboxes 188 is also displayed for each row. The checkboxes 188 can be toggled by the user using the positioning device 116, or alternative methods of setting the checkboxes 188 similar to time option 150 and alarm time option 184 may also be used. By toggling the checkboxes 188, the user is able to change the individual days of the week on which an alarm of the specified row is set to "on". Alternatively, a single checkbox for weekdays and a single checkbox for weekends can be provided or an entire month's worth of checkboxes. Preferably, seven checkboxes as shown is used for implementing a weekly alarm routine.

An indicator colour option 185 is also selectable by the user using the same methods as described for alarm time option 184 and checkboxes 188. In combination with setting the coloured indicator option 160a to "on" in the multi alarm menu 172 the indicator colour option 185 changes the colour of the bell-shaped alarm indicator to visually distinguish between different alarms. For example, one alarm time may be set for waking in the morning and be set to have a blue colour, and a second alarm time may be used in the same day for taking medication. To distinguish between these alarm types, a red colour can be given to the medication alarm.

Similarly, the colour option 185 can be supplemented or replaced with a changeable graphic option (not shown) that enables the alarm indicator to visually distinguish between different alarms. For example, an alarm for waking a user could include a sun graphic, which indicates that the next alarm is the user's morning alarm. Then, when the next alarm is one pertaining to medication, a red cross or "Rx" symbol could replace the sun graphic to indicate that the next alarm will indicate that medication is to be taken. In this way, a further visual cue can be provided to distinguish between multiple alarms at first glance.

Figure 15:
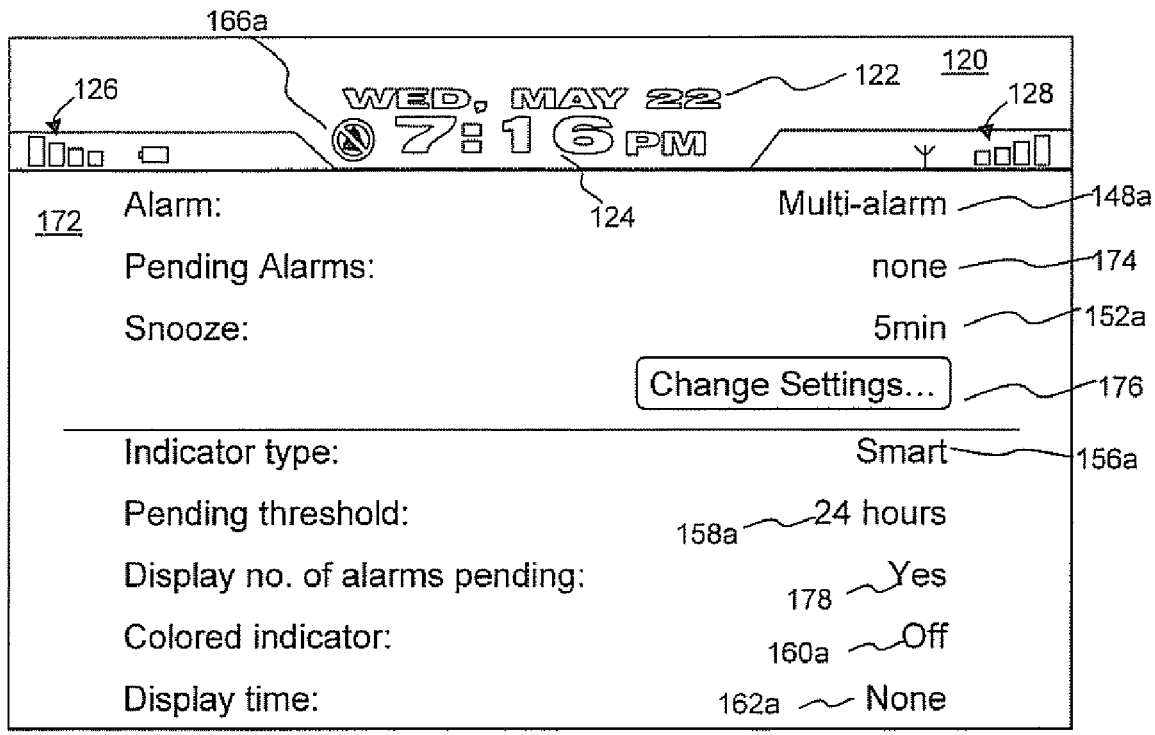
FIG. 15 is the alarm menu of FIG. 13 showing the alarm indicator when there are no pending alarms.

The effect of alarm settings selected in selection menu 180 shown in FIG. 14 can be exemplified in FIG. 15. In the multi-alarm menu 172 of FIG. 15, the date display 122 shows the current day of the week to be Wednesday. However, according to the selected checkboxes 188 shown in FIG. 14. no alarms are scheduled for Thursday. As such, there are no alarms pending within the threshold option 158a of 24 hours. Therefore, based on the above-described logic, a crossed-out bell graphic 166a would be displayed by the processor 238 in region 130 as shown in FIG. 15, and the upcoming alarms list 174 would be updated to list "none" as the number of pending alarms.

The selection menu 180 also provides a save button 190 and a cancel button 192. Upon changing the alarm option settings in selection menu 180, the save button 190 can be selected to retain changes made to the alarm settings. Conversely, the selection of the cancel button 192 will discard any changes which have been made. The selection of either button 190 or 192 will close the selection menu 180 and return control to the multi-alarm menu 172.

Below the "Change Settings" button 176, an indicator type option 156a, a pending threshold option 158a, a coloured indicator option 160a, and a display time option 162a, all similar to the corresponding options in application 146 are provided. A "Display no. of alarms pending" option 178 is also provided in the multi-alarm mode, which enables the user to view the number of alarms within the pending threshold as defined by option 158a.

Figure 16:
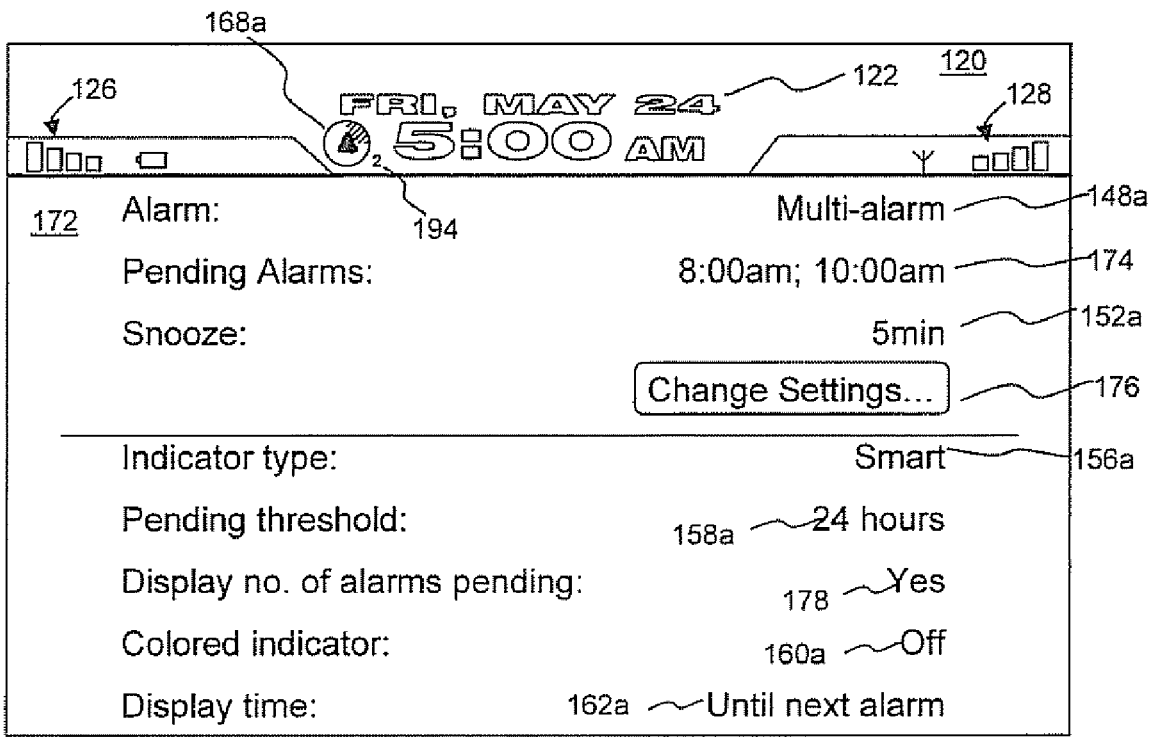
FIG. 16 is the alarm menu of FIG. 13 showing the alarm indicator displaying the time until the next alarm and the number of pending alarms.

The effect of selecting option 178 is exemplified in FIG. 16, in which the alarm settings shown selection menu 180 of FIG. 14 are applicable. The date display 122 in FIG. 16 shows the day of the week to be Friday. According to the alarm settings, alarms at 8:00 am and 10:00 am have been set for Friday morning, with these alarms correspondingly displayed in the upcoming alarms list 174. Since option 178 is set to "yes", a numerical graphic 194 appears in combination with a combined bell icon and stopwatch icon 168a. The graphic 194 conveniently indicates to the user at first glance that two (2) alarms are pending within the user-defined threshold. The combined bell and stopwatch icon 168a is displayed according to the alarm settings similar to those set for icon 168 shown in FIG. 12.

Figure 17:
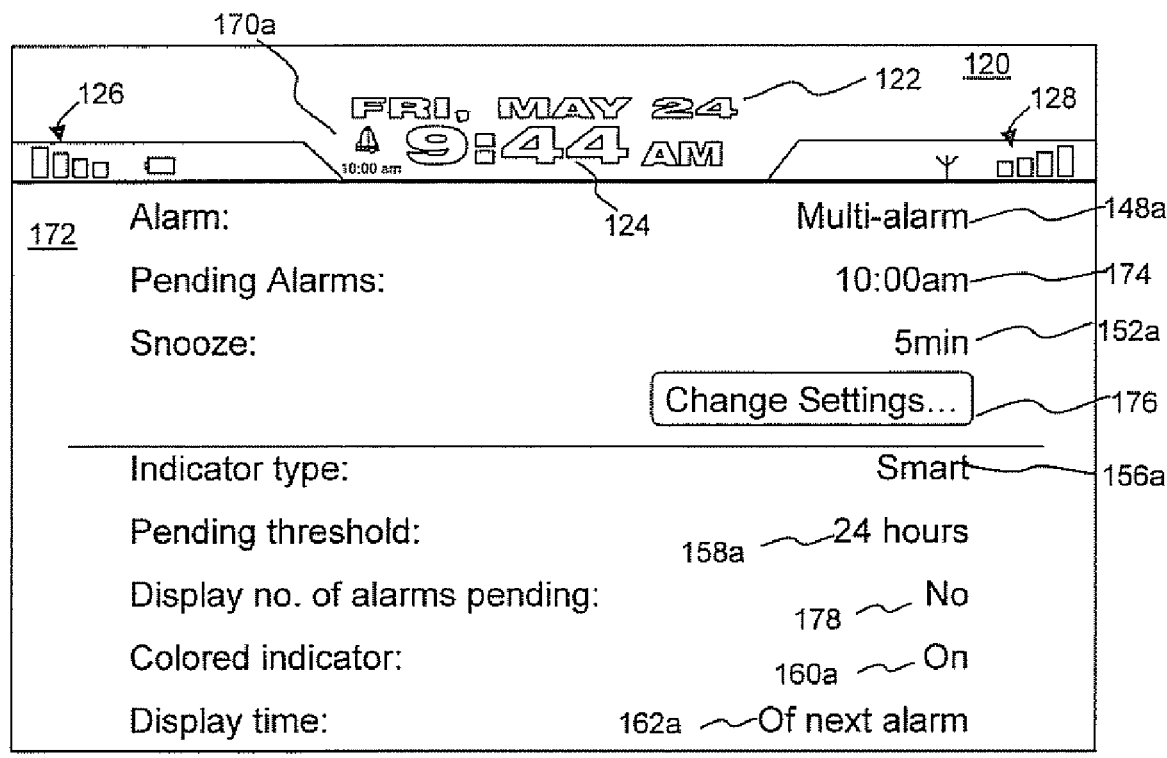
FIG. 17 is the alarm menu of FIG. 13 showing the alarm indicator displaying the time of the next alarm with a coloured indicator.

In FIG. 17, the alarm settings shown in selection menu 180 of FIG. 14 are again applicable. The date display 122 shows the day of the week to be Friday, and the time display 124 shows the time to be 9:44 am. The alarm icon 170a reflects the settings of multi-alarm menu 172, where coloured indicator option 160a is "on" and according to the algorithm 442, the processor 238 displays the time of the next alarm for option 162a. The alarm icon 170a is similar to the alarm icon 170 in FIG. 12, however, the function of the multiple alarm options as shown in multi-alarm menu 172 is exemplified. In the scenario shown in FIG. 17, the 8:00 alarm set in selection menu 180 has passed and there remains one alarm pending within the next 24 hours. Thus, the icon 170a displays the time of next alarm as being at 10:00 am, and the graphic 170a is coloured red to reflect the colour option 185 that has been set for the second alarm in FIG. 14, rather than the colour blue which has been set for the 8:00 am alarm.

As noted above, the alarm indicator region 130 is updated by the processor 238 according to the alarm indicator algorithm 442 that is stored in memory 224 on the mobile device 24. Typically, there are parameters that the algorithm 442 accesses and those parameters are typically available through service books or persisted on the device itself, e.g. the alarm time etc. The algorithm 442 periodically checks the alarm menu settings to determine if a display change is warranted and that is initiated upon a change in alarm settings. An example of the underlying logic utilized by the processor 238 according to the alarm indicator algorithm 442 is illustrated by the flow diagrams in FIGS. 18-20. Although the following describes control of the alarm indicator region 130 in term of operations performed by the alarm algorithm 442, it will be appreciated that the processor 238 initiates and controls the device 24 and display 112 according to the logic defined in the algorithm 442 stored in memory 224. It will also be appreciated that the various alarm settings are stored in memory 224 by the alarm application 146 and are accessed by the processor 238 during execution of the algorithm 442 for determining subsequent actions.

Figure 18:
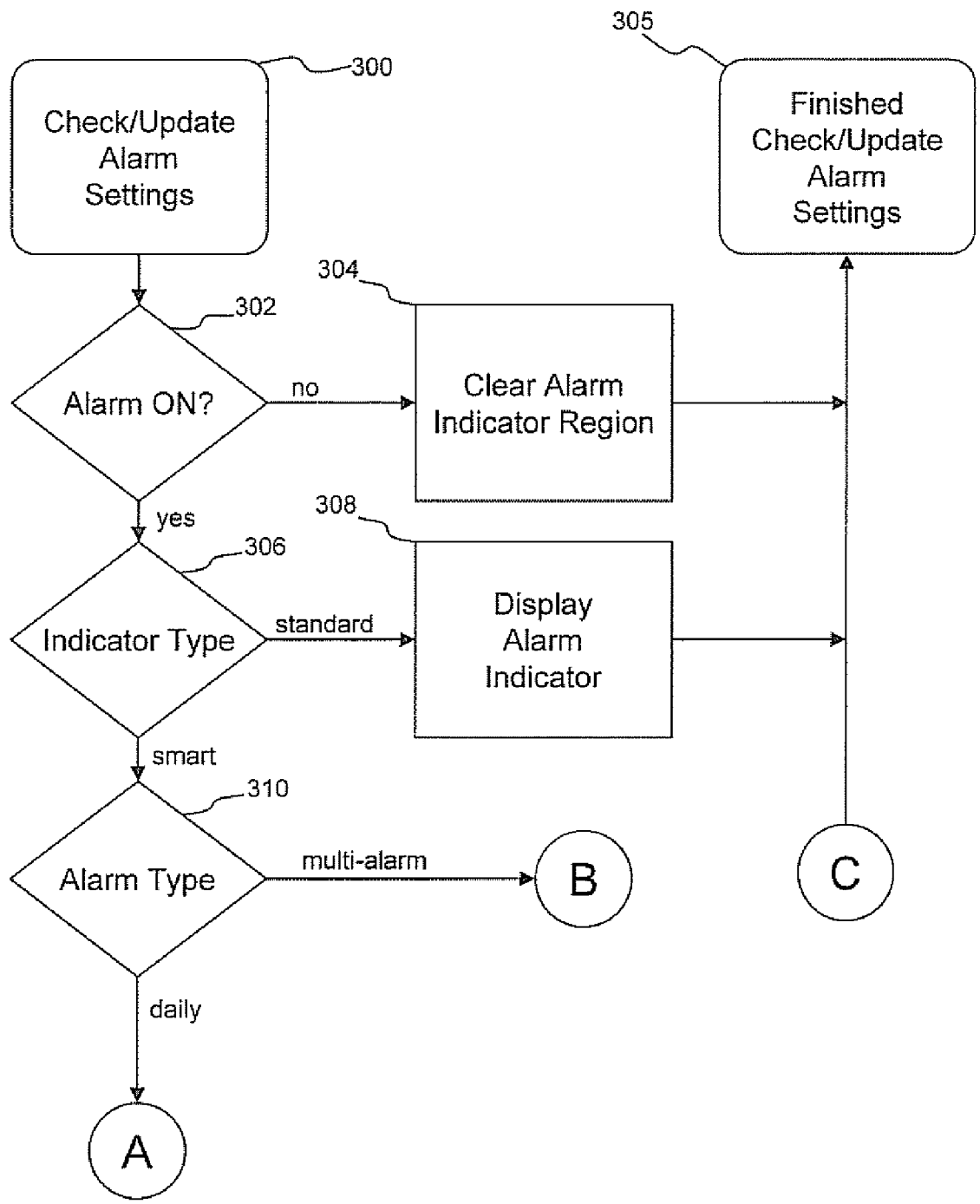
FIG. 18 is flowchart illustrating an alarm indicator algorithm main routine.

Referring first to FIG. 18, a function call 300 for checking and/or updating the alarm settings initiates the alarm indicator algorithm 442. As noted above, this can be triggered periodically at a predetermined intervals, upon the user changing and saving a setting (event), or a combination of both periodic and event-based triggering.

The algorithm 442 loads an update routine at step 302 where the algorithm 442 determines if the alarm has been set to be on by reviewing the settings stored in memory 224 by the alarm application 146. If not, the alarm indicator region 130 is cleared. The algorithm 442 then finishes the update routine at step 305. If the alarm is set to go off, either as a daily alarm or in multi-alarm mode, the algorithm 442 next determines the indicator type option 156 at step 304. If the alarm indicator 156 is set to be a standard display, then the alarm indicator is displayed at step 308, since the standard scheme does not distinguish between additional settings such as whether or not an alarm will go off on the weekend, i.e. the indicator will be displayed as long as the alarm is on. The alarm algorithm 442 then finishes the update routine at step 305. If the indicator type option 156 is set to "smart", then the algorithm 442 next distinguishes the alarm type 148, namely whether it is set to be a daily alarm or to comprise multiple alarms at step 310.

Figure 19:
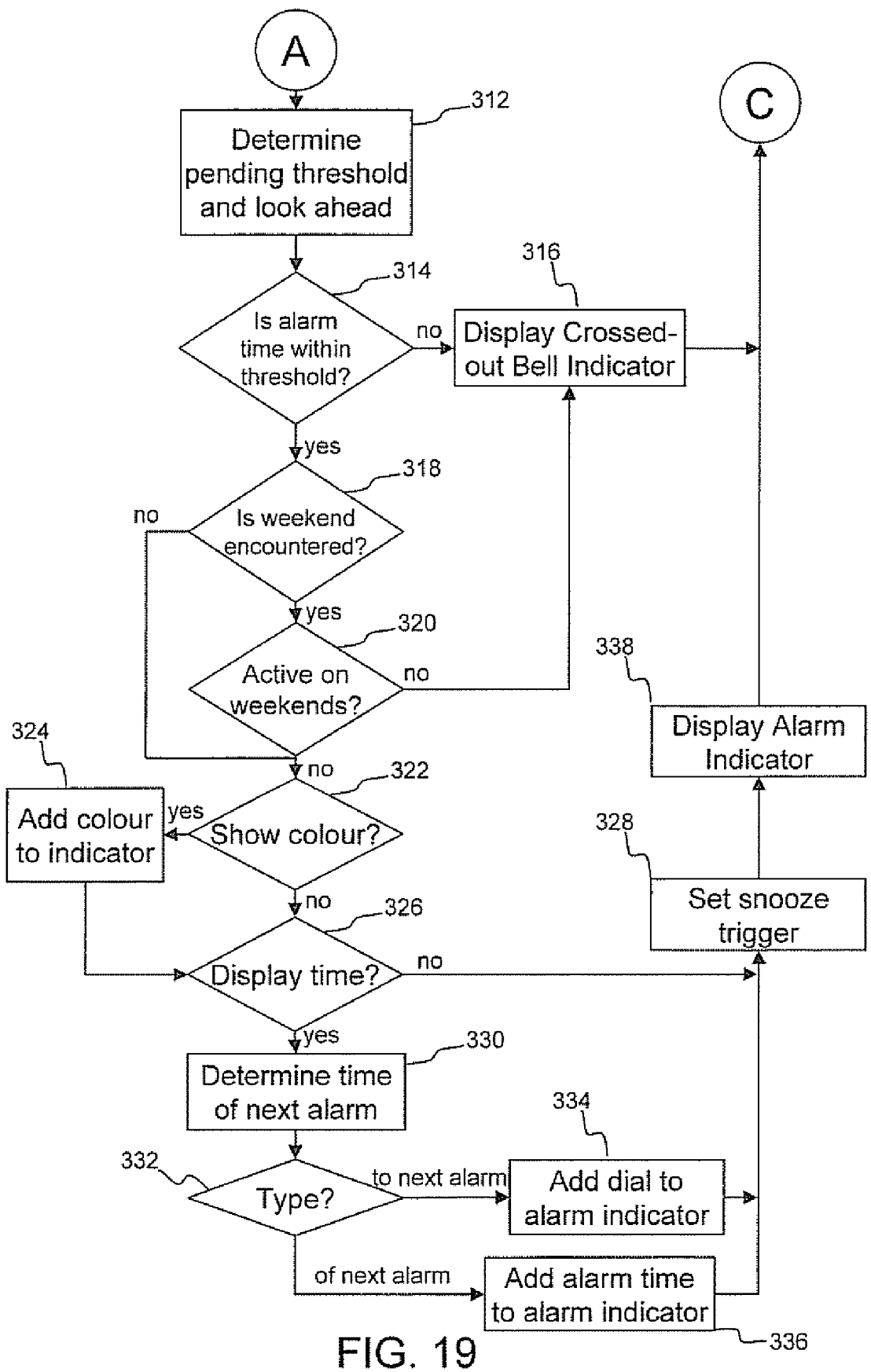
FIG. 19 is a flowchart illustrating a subroutine for the main routine of FIG. 18.

When the alarm type 148 is set to "daily", the algorithm 442 enters sub-routine A, illustrated in FIG. 19. When the alarm type 148 is set to "daily", the algorithm 442 first determines the time period for the pending threshold 158 at step 312 and looks ahead to determine whether the next daily alarm is within the user-selected threshold at step 314. It will be appreciated that for a daily alarm with a 24 hour pending threshold, the next alarm will always be within view. However, a shorter threshold such as 8 hours would result in periods where the next alarm is not within view. Where the next alarm is not in view, the crossed-out graphic 166 can be displayed at step 316. If the next alarm is within view, the algorithm 442 then determines whether or not a weekend day is encountered at step 318.

If the pending threshold falls on a weekend day then the algorithm 442 next determines if the user has selected to have the alarm active on weekends at step 320. If the user has selected to not have the alarm go off on the weekend, then the crossed-out indicator is displayed at step 316. If a weekend is not encountered and/or the "active on weekends" option 154 has not been selected, then the algorithm 442 next determines if the user has opted for a coloured display at step 322. If the user has opted to use colour to distinguish the versions of each indicator, the associated colour is added to the indicator 164 at step 324. The algorithm 442 then determines at step 326 whether or not the "display time" option 162 is set to "none" at step 332. If not, the snooze trigger is set at step 328 and the alarm indicator 164 (e.g. bell graphic) is displayed at step 338. Once the indicator 164 has been displayed, the algorithm 442 exits subroutine A and returns to the main routine at C where the routine finishes at step 305.

The nature of the snooze trigger depends on the snooze option 152 set by the user. The snooze trigger will cause the alarm to re-activate after a certain time interval following the initial and/or previous alarm activation. The snooze alarm is typically a flag that is associated with the time-based trigger for the alarm itself. When the alarm is "snoozed" by the user, the algorithm 442 sets (flags) the alarm state to snooze and then schedules the alarm to trigger with the current time+the snooze time. When the alarm is dismissed, the algorithm 442 sets the state to alarm (or "on") and then schedules the alarm to trigger at its next scheduled time.

If the display time option 162 has been set to something other than "none", the algorithm 442 then determines whether the option 162 has been set to "of next alarm" or "to next alarm" at step 332. If the option 162 is set to "of next alarm", the text indicating the time of the next alarm is added to the alarm indicator to create the combined graphic 170 shown in FIG. 12. If the "to next alarm" option has been set, then the combined graphic 168 is displayed as shown in FIG. 11.

Once the optional settings have been evaluated, the snooze trigger is set at step 328 and the alarm indicator is displayed at step 338 with all the user-selected settings according to the evaluation of these settings by the algorithm 442. The subroutine A is then exited and the algorithm 442 returns to the main routine at C.

Figure 20:
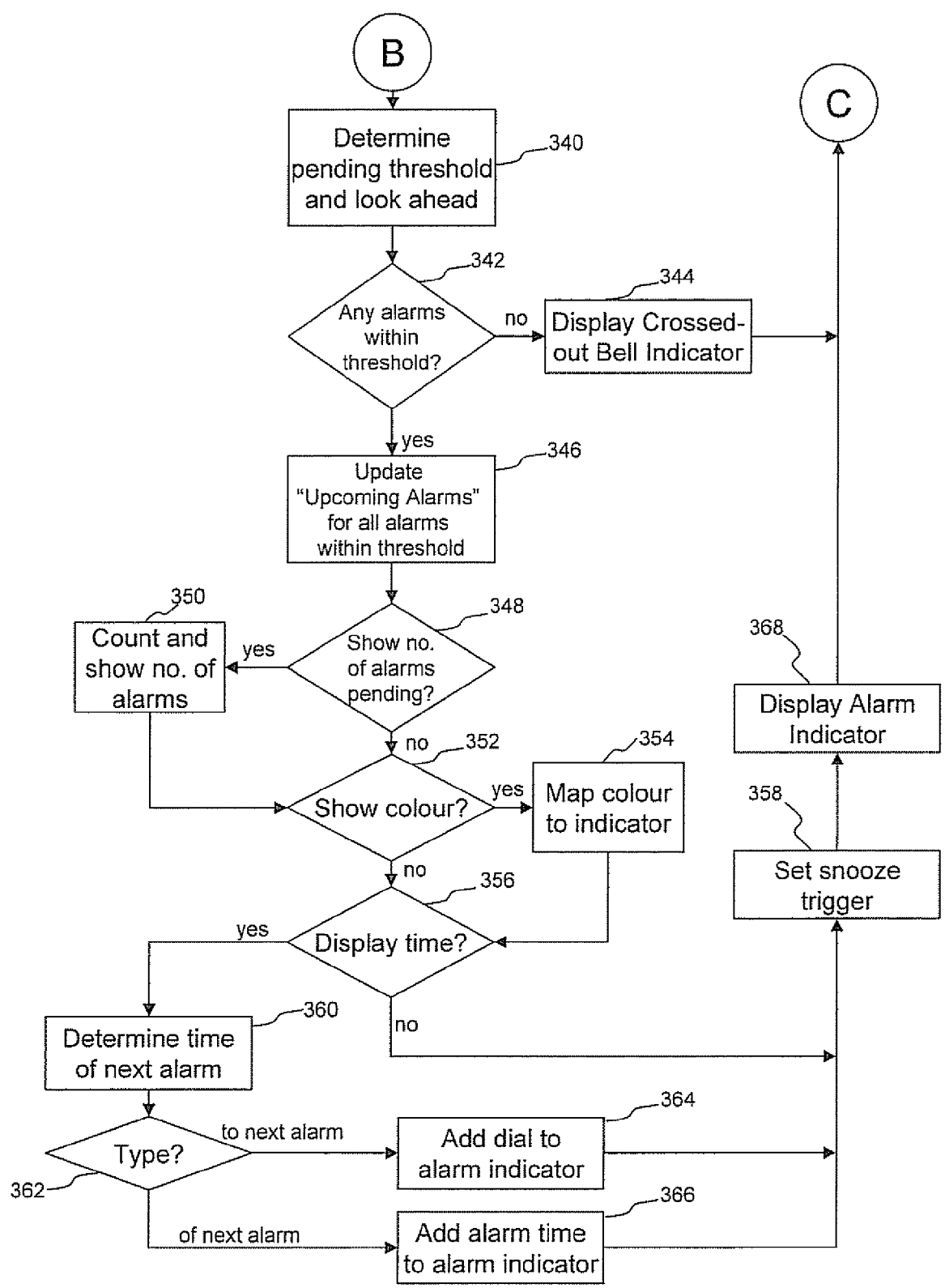
FIG. 20 is a flowchart illustrating another subroutine for the main routine of FIG. 18.

When the multi-alarm option has been selected, the algorithm 442 enters subroutine B, illustrated in FIG. 20. In subroutine B, the algorithm 442 first checks the pending threshold at step 340 and determines if there are any alarms within the threshold at step 342. Step 342 involves evaluating the settings associated with the check boxes 188 shown in FIG. 14. In the example shown in FIG. 14, at most there would be two alarms pending when the threshold is set to 24 hours. If there are no alarms pending, e.g. if viewed on Wednesday evening, encompassing Thursday, then the crossed-out graphic 166 is displayed at step 344 and the algorithm 442 exits subroutine B and returns to the main routine at C.

If there is at least one alarm pending within the threshold, the graphic 164 will be displayed at step 368 based on the following evaluation in steps 348-366. First, the upcoming alarms list 174 shown in the menu 172 is updated at step 346 based on the number of alarms pending within the threshold so that if the user enters the menu, the current number of pending alarms is shown. Next, the algorithm 442 determines if the user wishes to display the number of pending alarms 194 as shown in FIG. 16 at step 348. If yes, then the number of pending alarms stored in memory 224 is counted and displayed by the processor 238 at step 350. It should be noted that preferably, where multiple alarms may be activated, the pending threshold should be set to something less than 24 hours, otherwise the number of pending alarms will always show as being the total number of alarms. A default setting of, e.g. 12 hours should therefore be used where the number of pending alarms is displayed. In this way, based on the example shown in FIG. 14, after the 8:00 am alarm goes off, the number of pending alarms would change to "1" until at least after the 10:00 am alarm so that the user knows that another alarm is pending that day.

The alarm indicator is then tailored by evaluating the remaining settings in steps 352-366 similar to steps 322-336 shown in FIG. 19 and described above. It should be noted that in subroutine B, where the user has selected to have colour displayed, the algorithm 442 examines the colour option 185 selected for each respective alarm and maps the correct colour to the next alarm so the user can also distinguish between alarms visually based on colour. Therefore, e.g., after the 8:00 am alarm sounds, the colour can then change from blue to red and then back to blue after the 10:00 am alarm goes off.

It can therefore be seen that by considering more than two display states, the alarm indicator algorithm 442 exemplified above enables the user to determine at first glance the nature of the next alarm and in particular when an alarm is not set to go off on a particular day to avoid accessing the alarm application 146 every time this knowledge is desired or whenever the user is uncertain of the settings. The alarm indicator region 130 updates based on the user-defined settings and a predetermined threshold to intelligently display the nature of the next alarm and/or an upcoming time period. It will be appreciated that any number of the above described options can be used and the algorithm 442 should not be limited to such options so long as greater than two states can be displayed for the user should three different alarm states be implemented.

Figure 21:
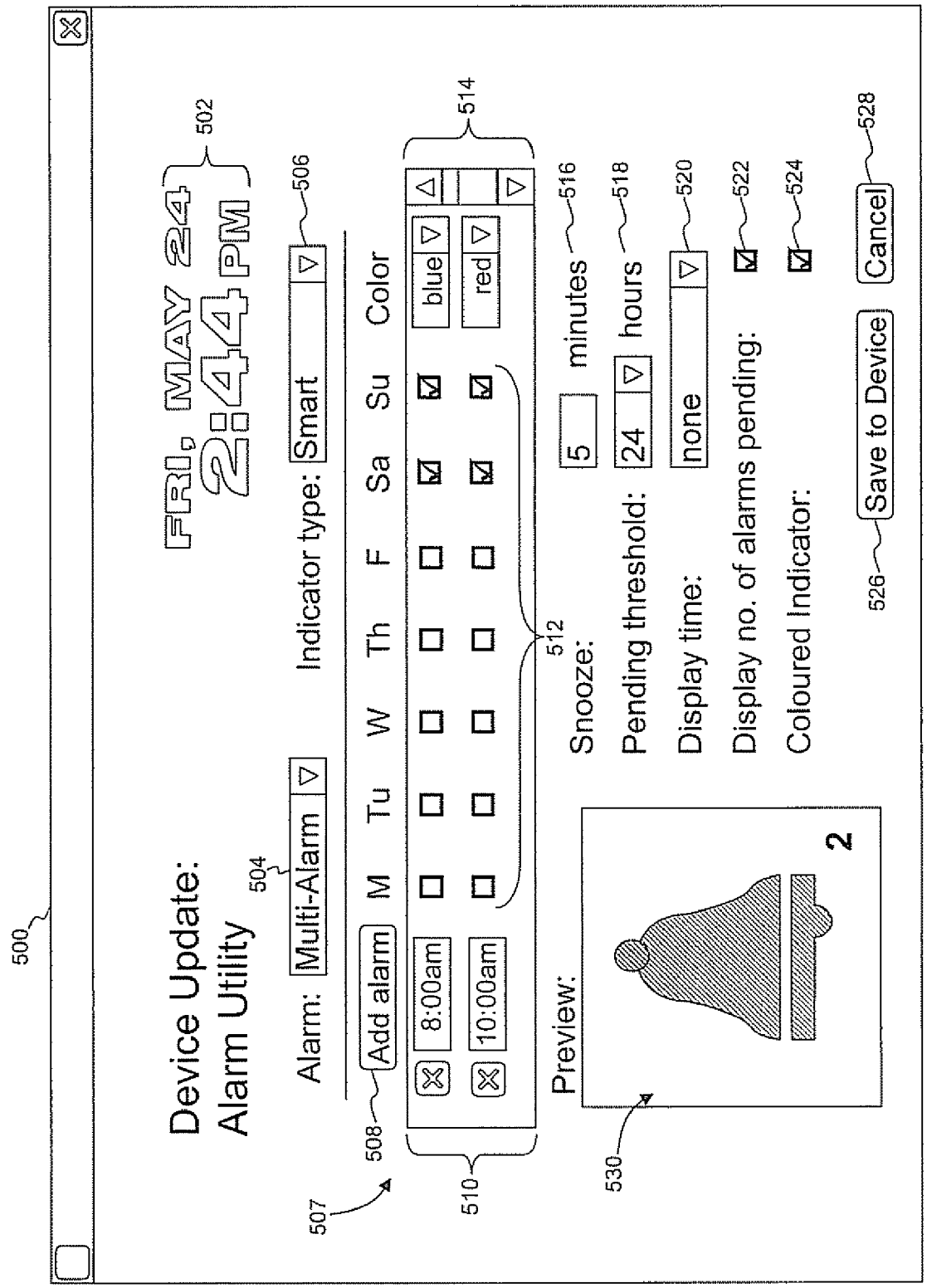
FIG. 21 is a schematic diagram of a remotely accessible application program interface (API) for selecting alarm features for a mobile device.

When the number of settings for the multi-state alarm is relatively large, requiring the navigation through multiple menus, a desktop web-based application program interface (API) may be used to facilitate setting and updating the alarm functions. An example API 500 is shown in FIG. 21. The API 500 preferably provides the same options presented to the user on the mobile device 24 and allows the user to change the settings using a more convenient remote computer 10 and have the settings synchronized with the device 24 using the communication system described in FIGS. 1-5.

The API 500 comprises a date/time display 502 for the user to reference when making their selections. The API 500 also provides an alarm type pull-down menu 504, an indicator type pull down menu 506 and applicable multi-alarm settings 507. Preferably, the multi-alarm settings are "greyed out" (inaccessible) when the "daily" or "off" options are chosen from menu 504. Alternatively, multiple windows or a single tabbed window could be used. The multi-alarm settings 507 in this example are an "add alarm" button 508, alarm time selectors 510 and a series of checkboxes 512 for each day of the week similar to FIG. 14. The multi-alarm settings 507 preferably also includes colour selectors 514 to associate a colour with each alarm when the "display colour" option checkbox 524 is selected.

A snooze entry box 516, a pending threshold pull-down menu 518 and a display time option 520 are also provided. The user may also select a "display no. of alarms pending" checkbox 522. Preferably, as the user selects their preferred options, a preview pane 530 is updated to show how the alarm indicator would look if the currently selected settings are saved. This enables the user to preview the various options to choose the most suitable type for the particular alarm. Once the desired settings have been entered, the user can select a "Save to Device" button 526, which is used to synchronize the settings with the mobile device 24. Selection of the "Cancel" button 528 enables the user to exit the API 500 without changing the current settings.

Figure 22:
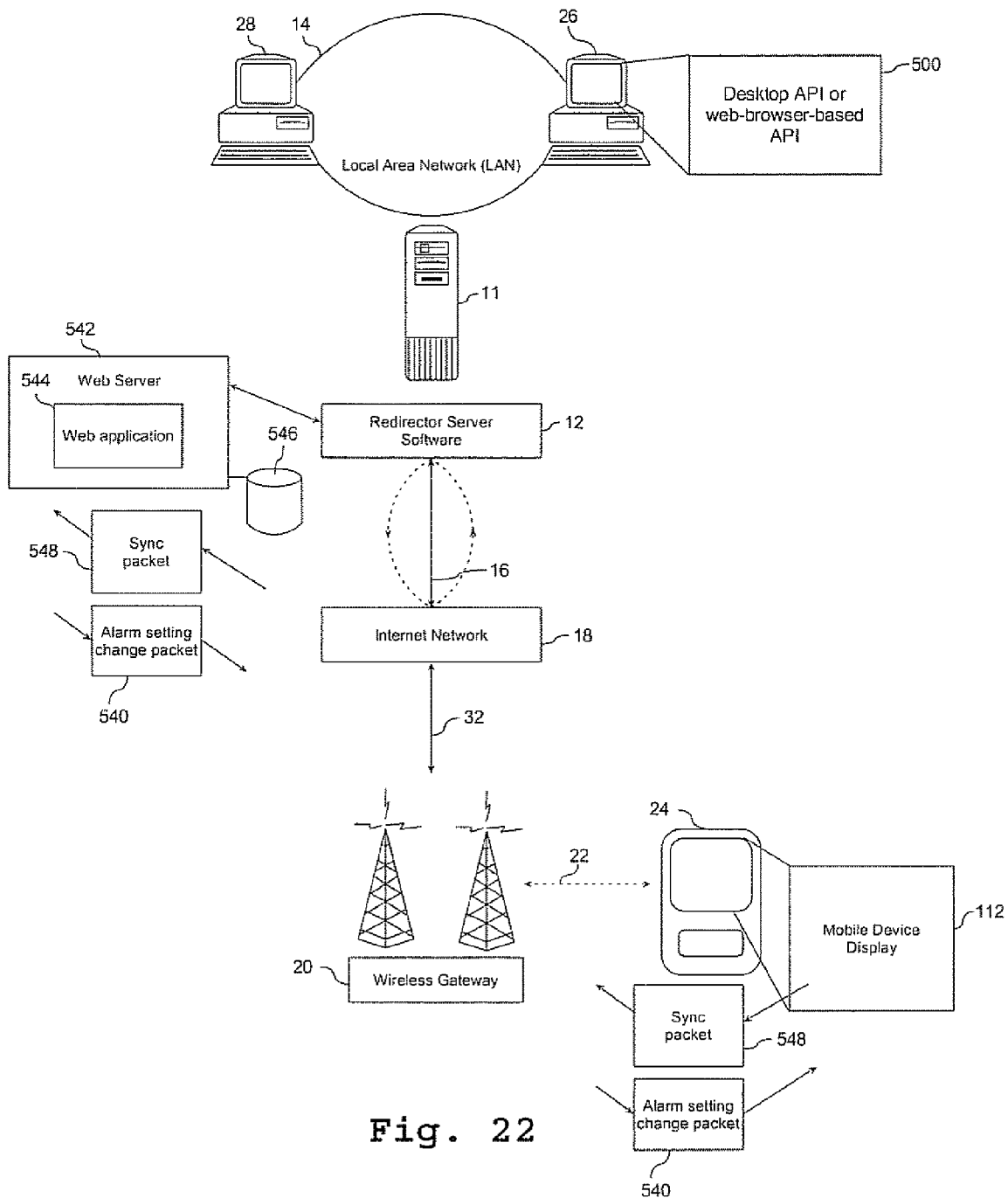
FIG. 22 is a schematic diagram of a communication scheme for using the API of FIG. 21.

Referring now to FIG. 22, the user accesses the API 500 using, e.g., a desktop PC 26, which either loads a locally stored executable program or a web-based application. Preferably, the user accesses a remote services website such as the Blackberry Internet Services. The website is hosted by a web server 542 and provides a web service 544. The web server 542 preferably stores user profiles for the respective devices 24 and updates the profiles based on the user selected options. The web server 542 shown in FIG. 22 is associated with the redirector server software 12 but may also be a stand alone entity, be associated with LAN 14 etc. The API 500 is preferably provided as a utility within the remote services website enabling the user to remotely set their alarm settings more conveniently using traditional interface devices such as a mouse, a keyboard and a monitor.

In the example shown in FIG. 22, when the user selects the save settings button 526, the web application 544 creates an "alarm setting change" data packet 540 that is pushed to the device 24 over the Internet Network 18 and wireless gateway 20. The packet 540 then communicates the new settings to the alarm program and updates the alarm indicator display region 130 according to the alarm indicator algorithm 442 described above. When the user chances the settings on the device 24, a "Sync" data packet is created that is pushed back to the web application 544 to update the user profile. The user profile is preferably stored so that when a user accesses their account via the API 500, their current settings are displayed. Alternatively, the scheme can operate in one direction and the API 500 would then load default settings each time the user accesses the web application 544.

Therefore, by utilizing the communication system described making reference to FIGS. 1-5, existing infrastructure can be used to remotely update the alarm settings using a remotely accessible API 500. As such, an increased number of options can be implemented on the device 24 whilst providing an alternative, convenient way for the user to change and update such settings. It will be appreciated that those examples described above are for illustrative purposes only and, in particular, any desired colour, text, graphics and auditory signals can be used to provide a visual (or auditory) cue to the user regarding the status of the alarms that have been set whilst also distinguishing between pending alarms and those that are suppressed for a certain predetermined period of time such as over a weekend.

Although the above has been described with reference to certain specific embodiments, various modifications thereof will be apparent to those skilled in the art as outlined in the appended claims.

What is claimed is:

1. A method of controlling an alarm for alerting a user of a mobile device of a predetermined time, said mobile device having an alarm application stored in memory and an alarm status indicator to indicate the status of the alarm at a particular location on a display of said mobile device outside of the alarm application, the method comprising:

storing on said mobile device, one or more settings associated with at least three states for said alarm, a first of said states being off, a second of said states being active, and a third of said states being active and suppressed for a predetermined time period;

upon said first state being active, said indicator being visually absent from said particular location on said display;

upon said second state being active, displaying a first version of said indicator on said display of said mobile device; and upon said third state being active, displaying a second version of said indicator on said display, said second version being visually distinguishable from said first version to thereby indicate to said user that said alarm has been set for said predetermined time but will not be triggered during said predetermined time period.

2. A method according to claim 1 comprising a plurality of alarms associated with said indicator, said one or more settings being associated with at least three states for each of said plurality of alarms.

3. A method according to claim 2 comprising determining which of said plurality of alarms is next and adapting said indicator according to the associated settings.

4. A method according to claim 2 comprising determining a number representing how many of said plurality of alarms are pending within a predetermined time period and adapting said first version to indicate said number.

5. A method according to claim 2 comprising associating a different colour with said first version for each of said plurality of alarms.

6. A method according to claim 1 comprising changing between said second state and said third state at the expiry of said predetermined time period.

7. A method according to claim 1 comprising adapting said first version to indicate one or more of a colour distinguishable from said second version, a time until said alarm, and the time of said alarm.

8. A method according to claim 1 wherein said method initiates upon one or more of periodic time intervals to continually update said indicator based on current settings, and one or more of a change in said states and a change in said settings.

9. A computer readable medium comprising computer readable instructions for performing the method of claim 1.

10. A mobile device having an alarm application stored in memory for controlling an alarm for alerting a user of said mobile device of a predetermined time, said alarm application storing one or more settings associated with at least three states for an alarm status indicator, said mobile device comprising a display providing said alarm status indicator to indicate the status of the alarm at a particular location on said display outside of said alarm application, said alarm status indicator comprising:

a first version displayable at said particular location in a first state and being indicative of said alarm being active; and a second version displayable at said particular location in a second state and being indicative of said alarm being active and suppressed for a predetermined time period, said second version being visually distinguishable from said first version to thereby indicate to said user that said alarm has been set for said predetermined time but will not be triggered during said predetermined time;

wherein the absence of said indicator at said particular location indicates a third state indicative of said alarm being off.

11. A mobile device according to claim 10 wherein said second version is a crossed-out version of said first version.

12. A mobile device according to claim 10 wherein said first version is a pictorial graphic.

13. A mobile device according to claim 10 wherein said first version is adapted to display a textual indication of the time at which said alarm will go off.

14. A mobile device according to claim 10 wherein said first version is adapted to display a graphical indication of the time until said alarm will go off.

15. A mobile device according to claim 10 wherein said first version is adapted to display a predetermined colour associated with said alarm.

16. A mobile device according to claim 15 comprising a plurality of alarms and said first version is adapted to display a different colour for each of said plurality of alarms.

17. A mobile device according to claim 10 comprising a plurality of alarms and said first version is adapted to display a number associated with how many of said plurality of alarms are pending within a predetermined time period.

18. A mobile device according to claim 10 in which each alarm relates to a predetermined time at which the user of the device will be alerted.

19. A mobile device according to claim 10 wherein said application lists one or more or any combination of: settings associated with a time associated with said alarm, a snooze function, an option to initiate said third state, a pending threshold, an option for displaying a colour associated with said first version, an option to display the time until or the time of said alarm, and an option to display the number of alarms that will go off during said pending threshold.

20. A mobile device according to claim 10 further comprising a sub-menu associated with an option for setting a plurality of alarms, said sub-menu comprising one or more of an option for selecting a number of total alarms, an option to select predefine time periods associated with each of said plurality of alarms, and an option to associate a colour with each of said plurality of alarms.

21. A mobile device according to claim 10 further comprising a remotely accessible computer application accessible remotely from said mobile device, said remotely accessible computer application providing said menu and enabling a user to synchronize settings selected in said remotely accessible application with said mobile device.

* * * * *

UNITED STATES PATENT AND TRADEMARK OFFICE
CERTIFICATE OF CORRECTION

| | | |
|---|---|---|
| PATENT NO. | : 7,656,275 B2 | Page 1 of 1 |
| APPLICATION NO. | : 11/615029 | |
| DATED | : February 2, 2010 | |
| INVENTOR(S) | : Keizo Marui | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 489 days.

Signed and Sealed this

Twenty-eighth Day of December, 2010

David J. Kappos
*Director of the United States Patent and Trademark Office*